United States Patent
Beltran et al.

(10) Patent No.: US 10,396,671 B2
(45) Date of Patent: Aug. 27, 2019

(54) POWER SUPPLIES HAVING POWER SWITCHES CONTROLLABLE WITH A VARYING FREQUENCY, DUTY CYCLE AND/OR PHASE TO REGULATE OUTPUTS

(71) Applicant: Astec International Limited, Kwun Tong (HK)

(72) Inventors: Israel Gomez Beltran, Antipolo (PH); Siu Lun Wu, Tai Po (HK)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/411,458

(22) Filed: Jan. 20, 2017

(65) Prior Publication Data
US 2018/0212525 A1 Jul. 26, 2018

(51) Int. Cl.
*H02M 3/335* (2006.01)
*H02M 3/337* (2006.01)
*H02M 1/00* (2006.01)

(52) U.S. Cl.
CPC ....... *H02M 3/33546* (2013.01); *H02M 3/337* (2013.01); *H02M 3/33592* (2013.01); *H02M 2001/0058* (2013.01); *Y02B 70/1475* (2013.01); *Y02B 70/1491* (2013.01)

(58) Field of Classification Search
CPC . H02M 2007/4818; H02M 2007/4815; H02M 3/33538; H02M 3/33546; H02M 3/33515; H02M 3/33576; H02M 3/33592; H02M 3/33507; H02M 3/335
USPC .................. 363/21.02, 21.03, 15–17, 97–98
See application file for complete search history.

(56) References Cited

U.S. PATENT DOCUMENTS

| 5,051,880 | A | 9/1991 | Harm et al. | |
|---|---|---|---|---|
| 7,379,309 | B2 | 5/2008 | Isurin et al. | |
| 8,018,740 | B2 | 9/2011 | Sun et al. | |
| 2014/0225439 | A1* | 8/2014 | Mao | H02M 3/3376 307/31 |
| 2014/0233267 | A1 | 8/2014 | Jin et al. | |
| 2014/0293670 | A1* | 10/2014 | Robertson | H02M 7/537 363/131 |
| 2015/0015071 | A1* | 1/2015 | Deboy | H02M 3/335 307/31 |
| 2015/0180345 | A1* | 6/2015 | Frost | H02M 3/3376 363/17 |
| 2015/0280545 | A1 | 10/2015 | Afsharian et al. | |
| 2015/0333634 | A1* | 11/2015 | Yoshida | H02M 3/33576 363/21.03 |

(Continued)

*Primary Examiner* — Bryan R Perez
(74) *Attorney, Agent, or Firm* — Harness, Dickey & Pierce, P.L.C.

(57) ABSTRACT

A switched mode DC-DC power supply includes a power circuit having an input for receiving an input voltage, an output for providing an output voltage, and four power switches coupled between the input and the output. The four power switches are arranged in a full bridge configuration. The power supply further includes a control circuit coupled to the power circuit for providing a plurality of control signals to the power switches. The plurality of control signals have a variable frequency. The control circuit is adapted to vary the frequency of the plurality of control signals, and to vary a parameter of only two of the plurality of control signals to regulate the output voltage. The parameter is a duty cycle or a phase of said two control signals. Other example switched mode DC-DC power supplies are also disclosed.

20 Claims, 16 Drawing Sheets

(56) References Cited

U.S. PATENT DOCUMENTS

2015/0381064 A1* 12/2015 Matsubara ........ H02M 3/33584
363/17
2016/0190944 A1* 6/2016 Uchihara .......... H02M 3/33561
363/17

* cited by examiner

POWER SUPPLIES HAVING POWER SWITCHES CONTROLLABLE WITH A VARYING FREQUENCY, DUTY CYCLE AND/OR PHASE TO REGULATE OUTPUTS

FIELD

The present disclosure relates to power supplies having power switches controllable with a varying frequency, duty cycle and/or phase to regulate outputs.

BACKGROUND

This section provides background information related to the present disclosure which is not necessarily prior art.

Power supplies can have various different power converter topologies such as a full bridge LLC converter. Sometimes, the full bridge LLC converter employs control signals each having a variable switching frequency and a maximum fixed duty cycle to regulate the output of the converter. During light-load conditions, the switching frequency can increase to high levels which may prevent zero voltage switching (ZVS). If the switching frequency increases above a particular value, the converter sometimes enters a burst mode operation.

SUMMARY

This section provides a general summary of the disclosure, and is not a comprehensive disclosure of its full scope or all of its features.

According to one aspect of the present disclosure, a switched mode DC-DC power supply includes a power circuit having an input for receiving an input voltage, an output for providing an output voltage, and four power switches coupled between the input and the output. The four power switches are arranged in a full bridge configuration. The power supply further includes a control circuit coupled to the power circuit for providing a plurality of control signals to the power switches. The control signals have a variable frequency. The control circuit is adapted to vary the frequency of the plurality of control signals, and to vary a parameter of only two of the plurality of control signals to regulate the output voltage. The parameter is a duty cycle or a phase of said two control signals.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
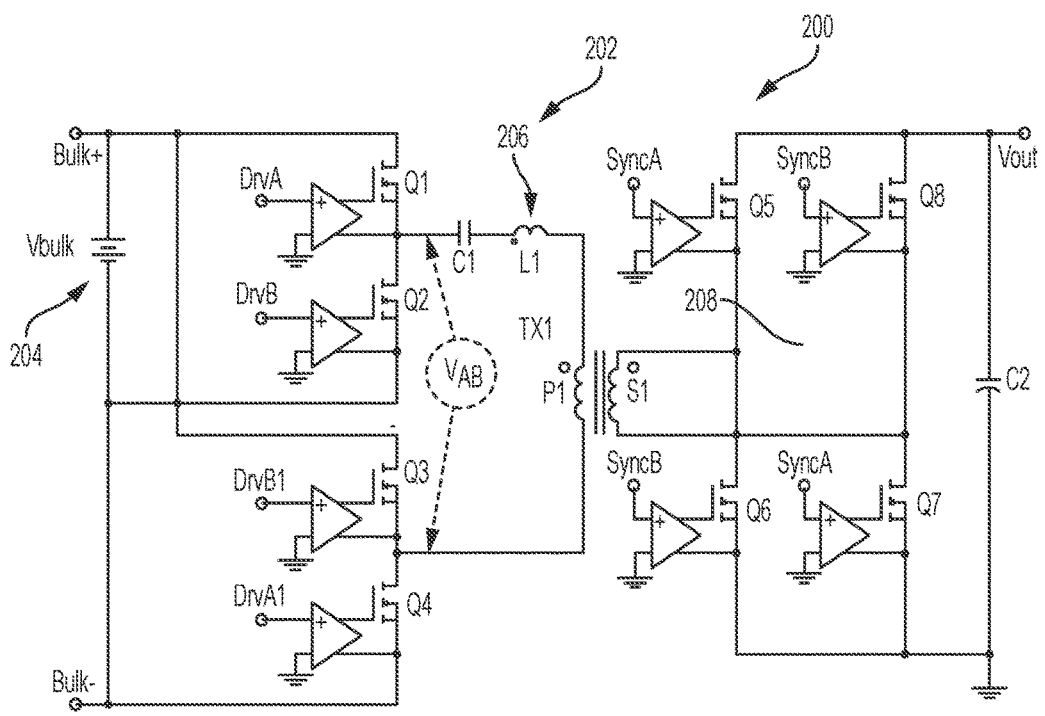
FIG. 2 is a schematic of a switched mode DC-DC power supply including a full bridge LLC converter including four MOSFETs, a transformer and a rectification circuit having four MOSFETs, according to another example embodiment.
Figure 4:
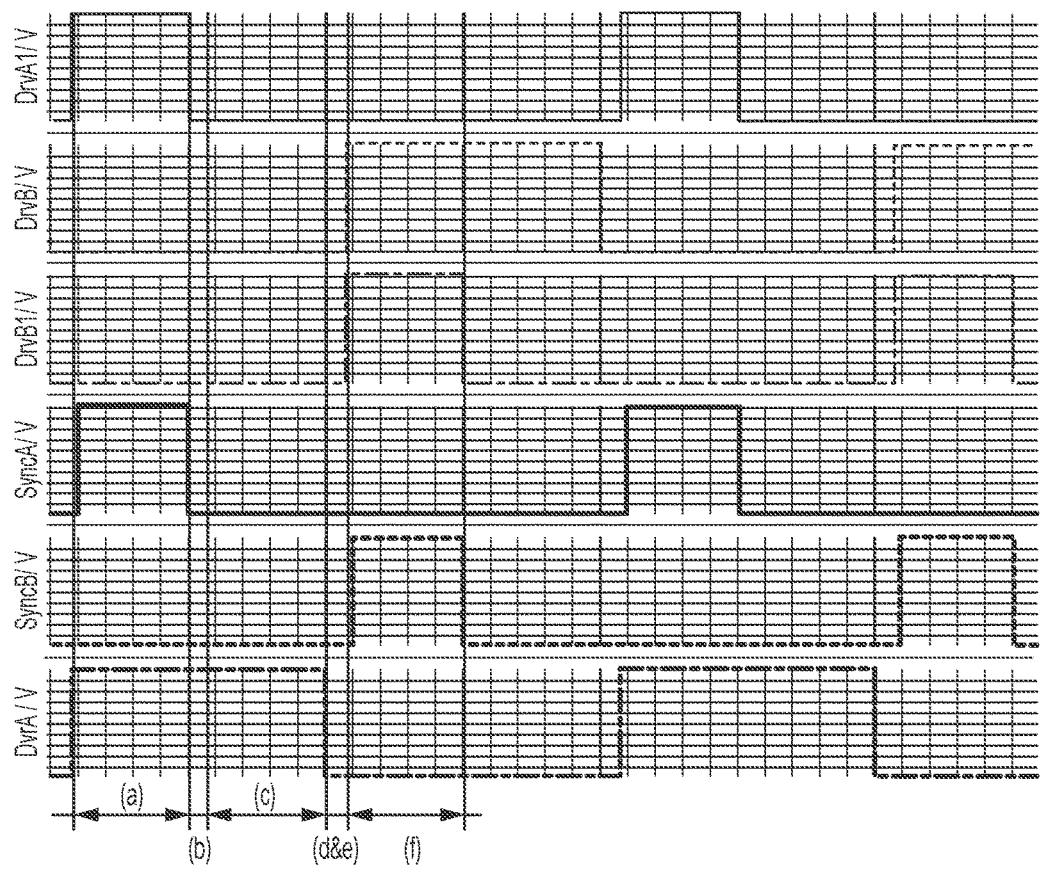
FIG. 4 is a timing diagram of control signals provided to the MOSFETs of the full bridge LLC converter of FIG. 2, in which two of the control signals have a varying duty cycle, according to another example embodiment.

FIGS. 5A-F illustrate an operation sequence of the power supply of FIG. 2 when operated with the control signals of FIG. 4, according to yet another example embodiment.

Figure 6:
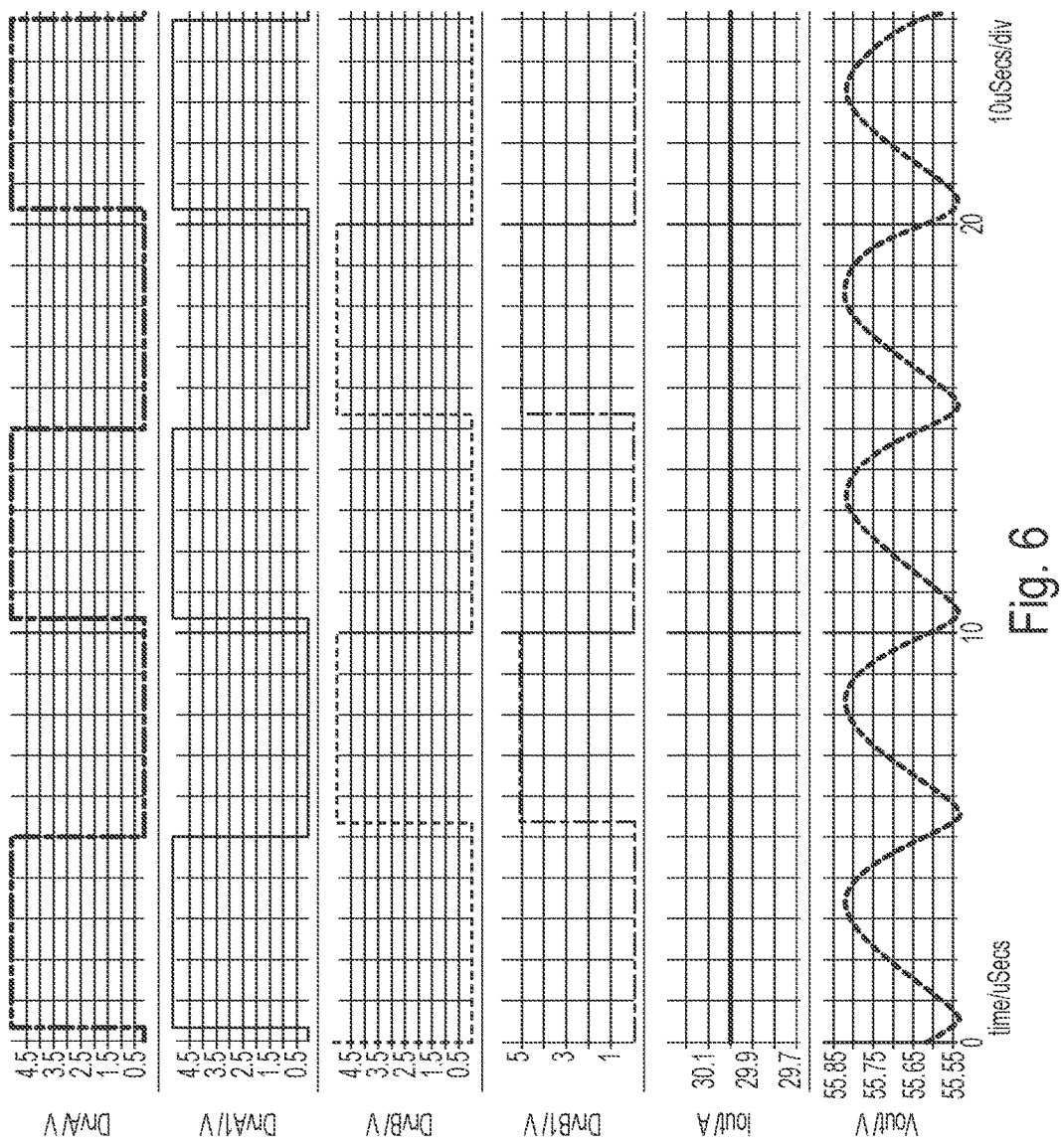

FIG. 6 is a timing diagram of control signals provided to the MOSFETs of the full bridge LLC converter of FIG. 2, in which the control signals each have a duty cycle of about 50%, according to another example embodiment.

Figure 7:
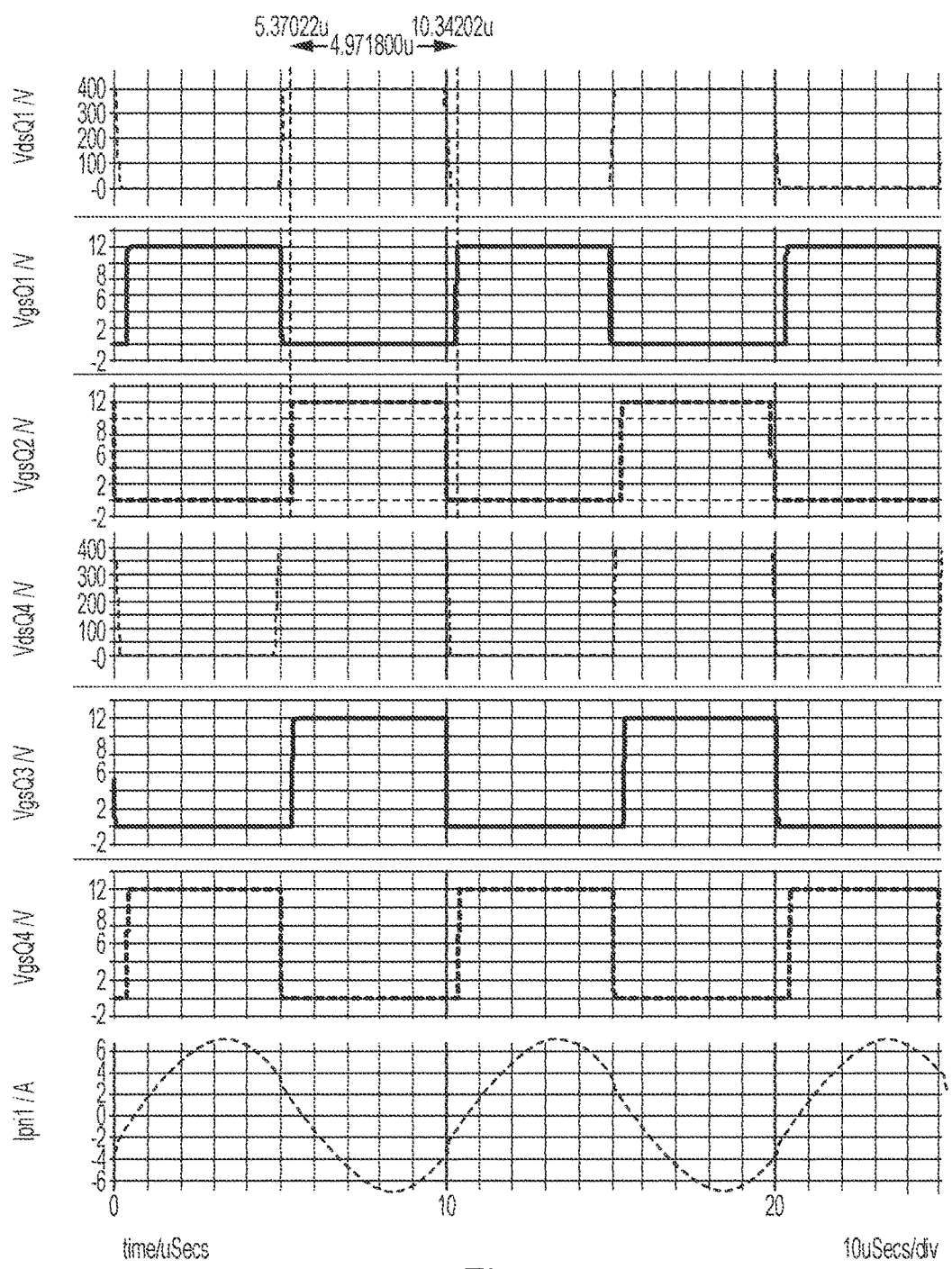

FIG. 7 is a timing diagram of voltages associated with the MOSFETs of the full bridge LLC converter of FIG. 2, which are controlled with the control signals of FIG. 6, according to yet another example embodiment.

Figure 8:
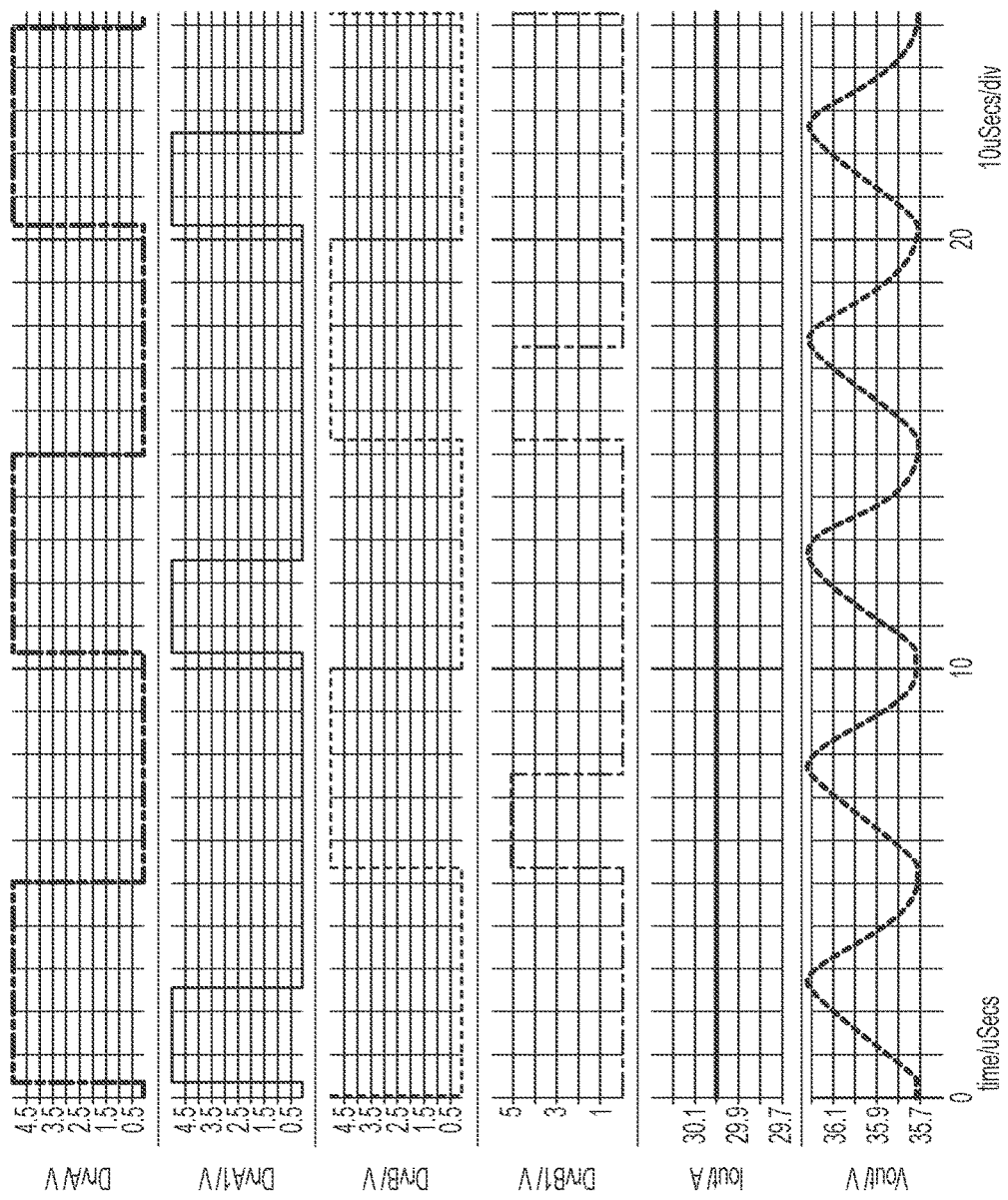

FIG. 8 is a timing diagram of control signals provided to the MOSFETs of the full bridge LLC converter of FIG. 2, in which two of the control signals have a duty cycle of about 50% and the other two control signals have a duty cycle of about 25%, according to another example embodiment.

Figure 9:
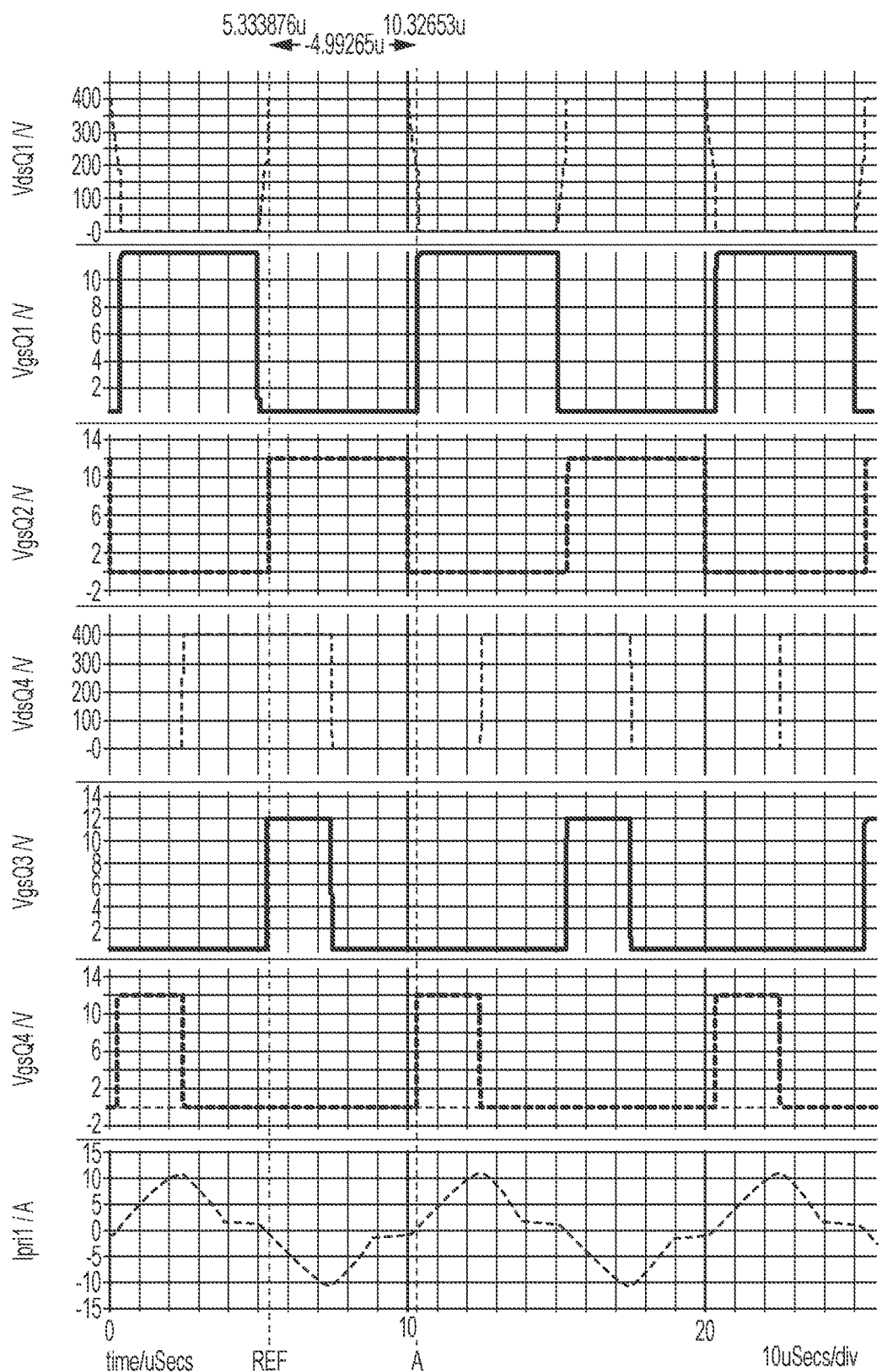

FIG. 9 is a timing diagram of voltages associated with the MOSFETs of the full bridge LLC converter of FIG. 2, which are controlled with the control signals of FIG. 8, according to yet another example embodiment.

Figure 10:
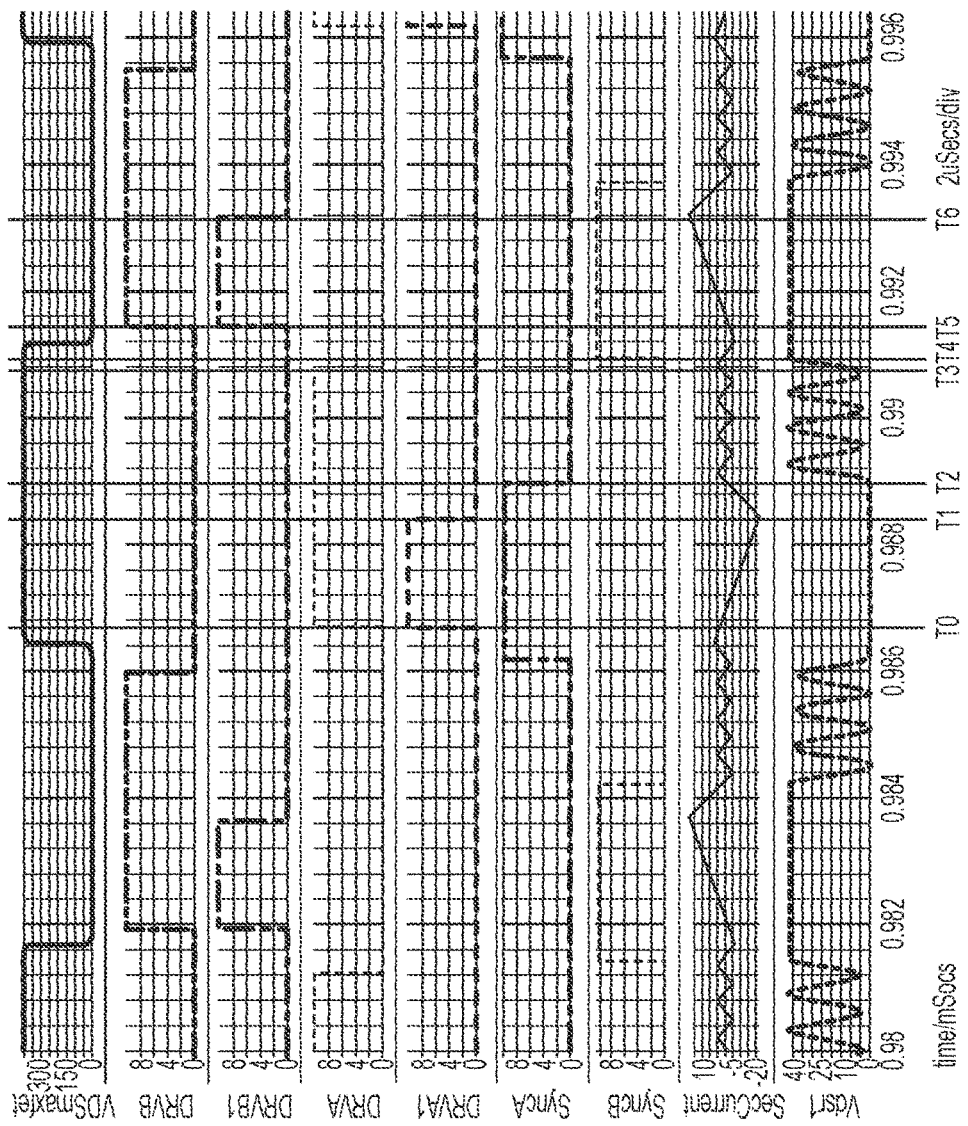

FIG. 10 is a timing diagram of control signals provided to the MOSFETs of the full bridge LLC converter of FIG. 2 and control signals provided to the MOSFETs of the rectification circuit of FIG. 2, according to another example embodiment.

FIGS. 11A-11H illustrate an operation sequence of the power supply of FIG. 2 when operated with the control signals of FIG. 10, according to yet another example embodiment.

Figure 12:
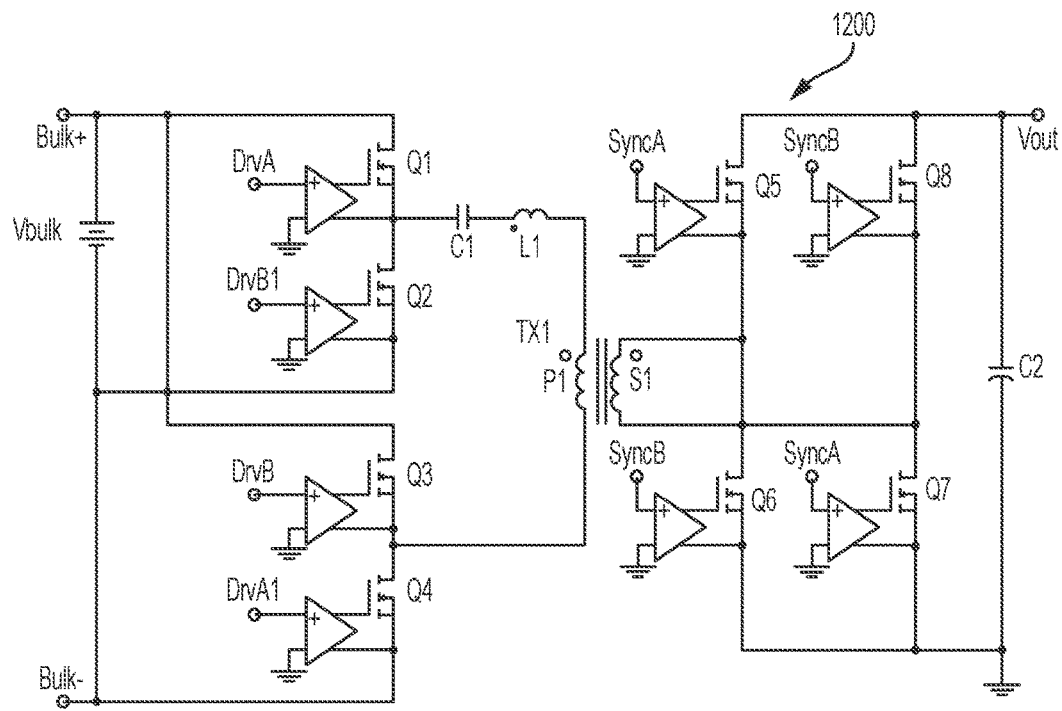

FIG. 12 is a schematic of a switched mode DC-DC power supply similar to the power supply of FIG. 2, but with a different gate drive circuit configuration according to another example embodiment.

Figure 13:
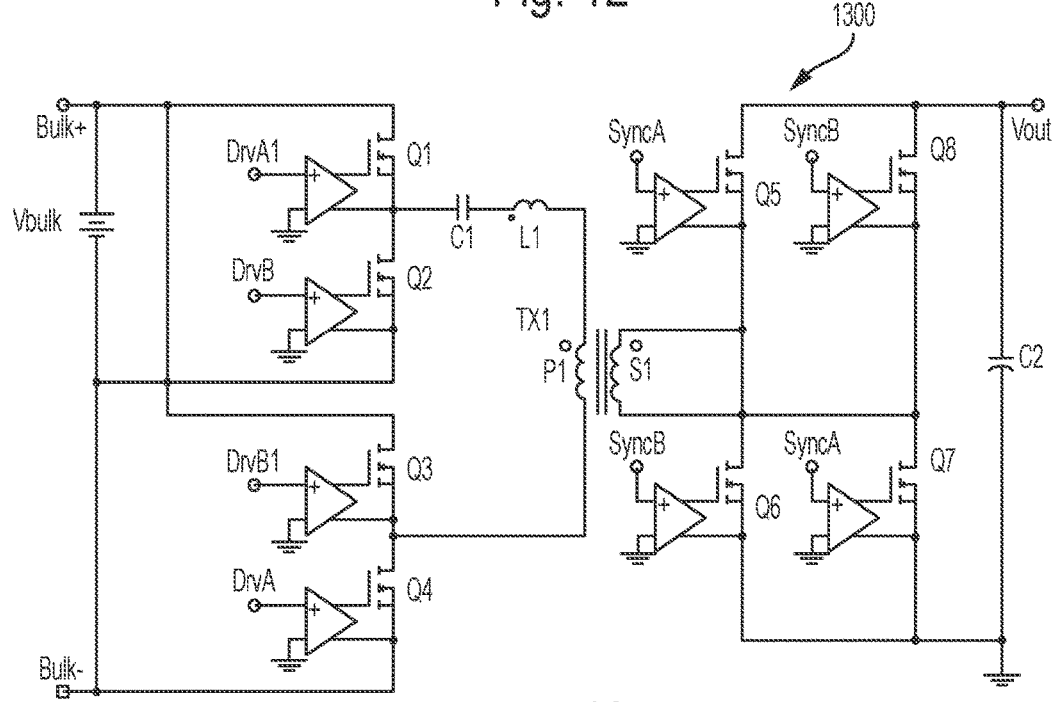

FIG. 13 is a schematic of a switched mode DC-DC power supply similar to the power supplies of FIGS. 2 and 13, but with a different gate drive circuit configuration according to yet another example embodiment.

Figure 14:
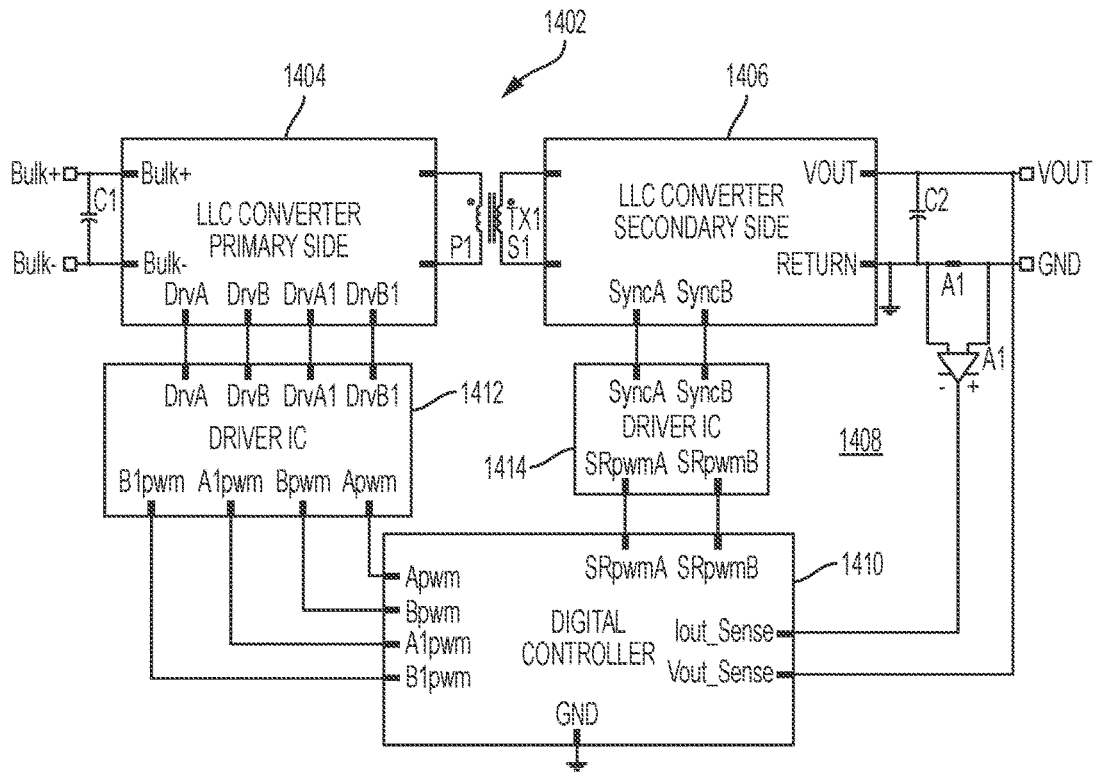

FIG. 14 is a block diagram of a switched mode DC-DC power supply similar to the power supplies of FIG. 2, but including a digital controller according to another example embodiment.

Figure 15:
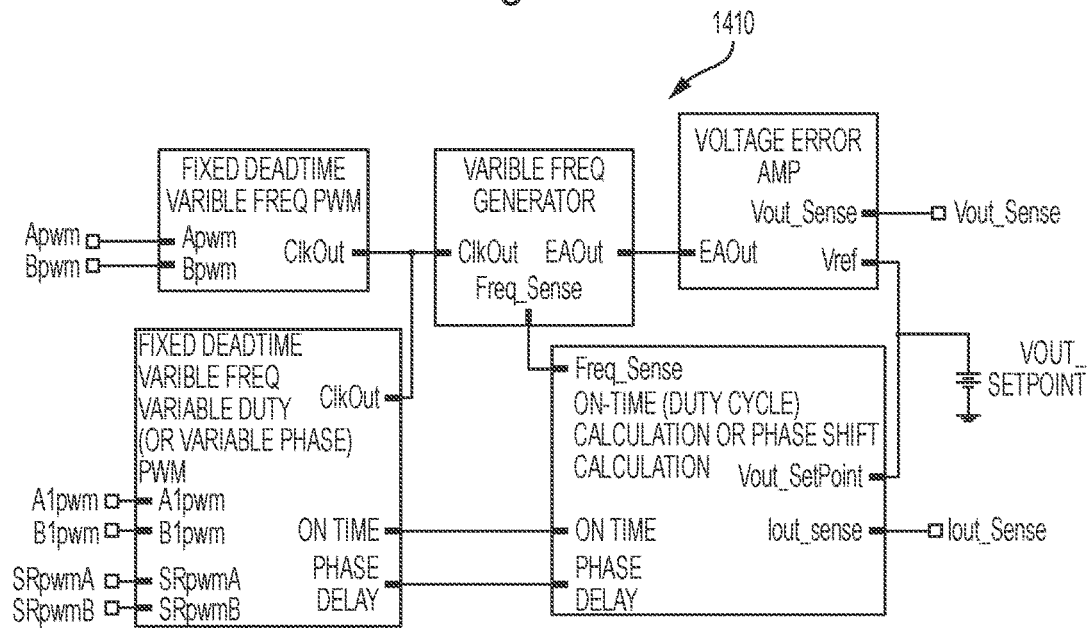

FIG. 15 is a block diagram of the digital controller of FIG. 14 according to yet another example embodiment.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
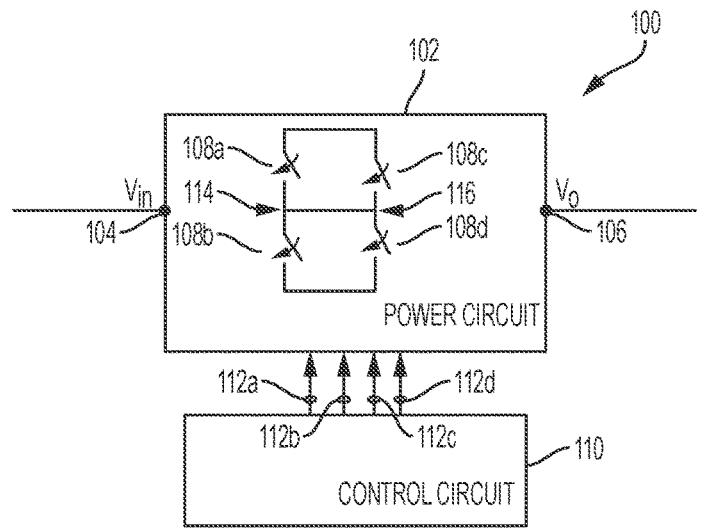
FIG. 1 is a block diagram of a switched mode DC-DC power supply including power switches arranged in a full bridge configuration, and controlled by control signals having a varying duty cycle or a varying phase, and a varying frequency, according to one example embodiment of the present disclosure.

A switched mode DC-DC power supply according to one example embodiment of the present disclosure is illustrated in FIG. 1 and indicated generally by reference number 100. As shown in FIG. 1, the switched mode DC-DC power supply 100 includes a power circuit 102 having an input 104 for receiving an input voltage Vin, an output 106 for providing an output voltage Vo, and four power switches 108a-d coupled between the input 104 and the output 106. The four power switches 108a-d are arranged in a full bridge configuration. The power supply 100 also includes a control circuit 110 coupled to the power circuit 102 for providing control signals 112a-d to the power switches 108a-d. The control signals 112a-d have a variable frequency. The control circuit 110 is adapted to vary the frequency of the control signals 112a-d, and to vary a parameter of only two of the control signals to regulate the output voltage Vo. The varying parameter can be a duty cycle or a phase of the two control signals.

For example, and as further explained below, the duty cycle of the control signals provided to the power switches 108c, 108d may be varied. In other embodiments, the phase of the control signals provided to the power switches 108c, 108d may be varied. Alternatively, the duty cycle or the phase of the control signals provided to two other power switches (e.g., the power switches 108a, 108b, etc.) of the power circuit 102 may be varied if desired.

These control signals having the varying parameter can assist in regulating the output voltage Vo, achieving zero voltage switching (ZVS) of the power switches 108a-d, etc., as further explained below. For instance, the switching frequency range for the power switches 108a-d can a change based on the load (e.g., light load conditions, full load conditions, etc.), a change in the input voltage Vin, etc. In some cases, the switching frequency can range between a low frequency (e.g., about 100 kHz, etc.) and a high frequency (e.g., about 300 kHz, etc.) depending on, for example, the output voltage Vo, a change in the output voltage set point (e.g., a regulation set point), etc.

If, however, the duty cycle or the phase of select control signals is varied, the switching frequency variation can be minimized. As such, a wide range of output voltage regulation (e.g., between about 40V and about 60V) can be accomplished while maintaining ZVS of the power switches and without substantially altering an output current of the power circuit 102

The parameter (e.g., the duty cycle or the phase) can be varied differently. In some instances it may be preferred to vary the parameter continuously. In other examples, the parameter can be varied in steps. For example, the duty cycle can be varied continuously, in steps, etc. Alternatively, the phase can be varied continuously, in steps, etc. Additionally, the parameter can be varied linearly or nonlinearly.

As explained herein, the control circuit 110 varies the frequency of the control signals 112a-d. For example, the frequency of each control signal 112a-d may vary the same between about 100 kHz and about 300 kHz and/or another suitable range.

As shown in FIG. 1, the power switches 108a-d form two legs of the full bridge configuration. For example, the power switches 108a, 108b are coupled together to form one leg 114, and the power switches 108c, 108d are coupled together form another leg 116. The legs 114, 116 are coupled together between the power switches 108a, 108b and the power switches 108c, 108d to form the full bridge configuration.

In the particular example of FIG. 1, the control circuit provides the control signals 112a-d to the power switches 108a-d, respectively. In other examples, the control signals 112a-d may be provided to different power switches, less control signals may be employed for controlling the power switches 108a-d, etc. Additionally, each of the control signals 112a-d may include a pulse width modulated (PWM) signal.

As explained herein, the control circuit 110 can vary the duty cycle or the phase of two control signals. For example, the duty cycle of the control signals 112c, 112d may be varied. In such examples, the duty cycle of each control signal 112c, 112d is varied substantially the same. Therefore, because the control signals 112c, 112d control the power switches 108c, 108d in FIG. 1, the duty cycle of each power switch 108c, 108d (forming the leg 116) can be varied.

The duty cycle of each control signal 112c, 112d can vary between a set of duty cycle values. For example, and as further explained below, the duty cycle of each control signal 112c, 112d can vary depending on the output voltage Vo, the output current, the input voltage Vin, the switching frequency, etc. In some examples, the control signal(s) 112c, 112d can vary between the fixed duty cycle (e.g., about 50%) of the other control signals 112a, 112b (explained above) and a defined duty cycle lower than this fixed duty cycle. For example, this defined duty cycle can be about 25%, or another suitable value.

The control circuit 110 ensures the duty cycle of each of the other control signals is fixed. For example, if the duty cycle of each control signal 112c, 112d is varied, then the duty cycle of each control signal 112a, 112b is fixed. In such examples, the duty cycle of each power switch 108a, 108b (forming the leg 114) is fixed. This fixed duty cycle can be set to a defined duty cycle value. In some preferred embodiments, the fixed duty cycle is a maximum duty cycle (e.g. about 50% including an appropriate dead time) of the control signals 112c, 112d. In other embodiments, the fixed duty cycle can be a value less than about 50%.

Alternatively, and as explained herein, the control circuit 110 can vary the phase of two control signals in addition to varying the switching frequency. Similar to the varying duty cycle control (explained above), varying the phase of two control signals can assist in regulating the output voltage Vo. For example, varying the phase of two of the control signals adjusts the amount of time in which the corresponding power switches are turned on. This adjustment can change a duty cycle of a voltage provided by the full bridge converter (e.g., the voltage between legs 114, 116). This changing duty cycle of the full bridge converter voltage (along with the varying frequency of the control signals 112a-d) can assist in adjusting the output voltage as desired.

The phase of the altered control signals can be shifted as necessary. For example, the altered control signals can each be phase shifted about 90 degrees, about 60 degrees, about 45 degrees, and/or suitable value relative to the other (non-shifted) control signals.

In some examples, if the control signals 112a-d control the power switches 108a-d, respectively, the control circuit 110 can vary the phase of the control signal 112c relative to the control signal 112b, and vary the phase of the control signal 112d relative to the control signal 112a. In such examples, the power switch 108c (forming a part of the leg 116) can be operated at a phase that is shifted relative to the power switch 108b (forming a part of the leg 114), and the power switch 108d (forming a part of the leg 116) can be operated at a phase that is shift relative to the power switch 108a (forming a part of the leg 114). Alternatively, the control circuit 110 can vary the phase of the control signal 112a, 112b instead of the control signals 112c, 112d.

When the two control signals are phase shifted as explained herein, the control circuit 110 can fix the duty cycle of the control signals 112a-d. For example, the fixed duty cycle can be set to a defined duty cycle value such as a maximum duty cycle (e.g. about 50%, etc.) as explained above and/or another suitable value.

The power circuit 102 of FIG. 1 can include various different full bridge converter topologies including, for example, a full bridge LLC converter topology. For example, FIG. 2 illustrates a DC-DC power supply 200 including full bridge LLC converter topology including similar features as the power supply 100 of FIG. 1.

As shown in FIG. 2, the power supply 200 includes a power circuit 202 having four MOSFET power switches Q1, Q2, Q3, Q4 arranged in a full bridge configuration, an input voltage source 204 providing an input voltage Vbulk to the power switches Q1, Q2, Q3, Q4, a resonant circuit 206, a rectification circuit 208 coupled to a filter (e.g., a capacitor C2), and a transformer TX1 having a primary winding P1 coupled to the power switches Q1, Q2, Q3, Q4 and a secondary winding S1 coupled to the rectification circuit 208. In the example of FIG. 1, the primary windings P1 of the transformer TX1, a resonant inductor L1 and a resonant capacitor C1 form the LLC resonant network.

As shown in FIG. 2, the rectification circuit 208 includes four MOSFET switching devices Q5, Q6, Q7, Q8 arranged in a full bridge configuration to provide synchronous rectification. Alternatively, the rectification circuit 208 can include more or less switching devices if desired and/or be configured without synchronous rectification. Additionally, although the switching devices of the rectification circuit 208 and the power switches of the power circuit 202 are shown as MOSFETs, it should be apparent to those skilled in the art that other switching devices (e.g., other FETs, diodes, etc.) may be employed if desired.

The power supply 200 of FIG. 2 can include one or more control circuits having gate drive circuits DrvA, DrvB, DrvB1, DrvA1 for generating control signals (e.g., PWM signals, etc.) for the power switches Q1, Q2, Q3, Q4, respectively, and gate drive circuits SyncA, SyncB for generating control signals (e.g., PWM signals, etc.) for the switching devices Q5, Q6, Q7, Q8 of the rectification circuit 208. As shown, the gate drive circuit SyncA generates control signals for the switching devices Q5, Q7, and the gate drive circuit SyncB generates control signals for the switching devices Q6, Q8.

In other examples, the control circuit(s) can include more or less gate drive circuits and/or other suitable drive circuits to generate control signals. For example, the control circuit(s) can include gate drive transformers for generating control signals. In such examples, a gate drive transformer can generate control signals for the power switches Q1, Q2, a gate drive transformer can generate control signals for the power switches Q3, Q4, and/or one or more gate drive transformer(s) can generate control signals for the switching devices Q5, Q6, Q7, Q8.

The control circuit(s) of FIG. 2 functions similar to the control circuit 110 of FIG. 1. As such, the control circuit(s) of FIG. 2 can control the power switches Q1, Q2, Q3, Q4 with control signals having a varying duty cycle or a varying phase, and a varying frequency, as explained above relative to FIG. 1. By employing this control method (along with the LLC network), ZVS can be achieved in the power switches Q1, Q2, Q3, Q4 at different output voltages and input voltages, as explained above.

Figure 3:
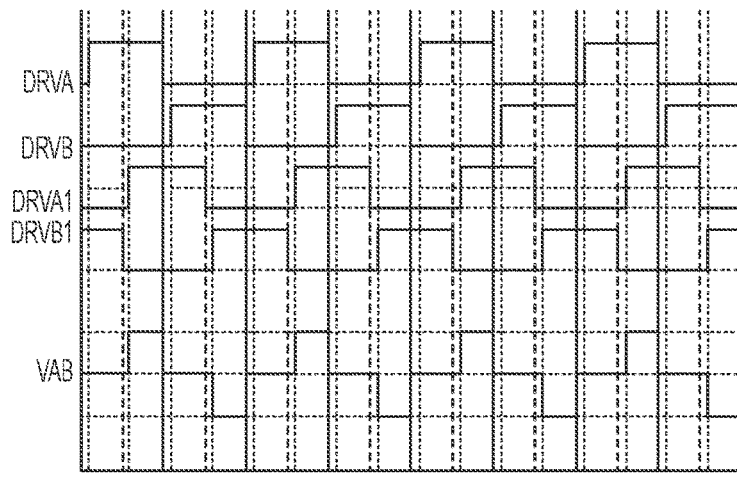
FIG. 3 is a timing diagram of control signals provided to the MOSFETs of the full bridge LLC converter of FIG. 2, in which two of the control signals have a varying phase, according to yet another example embodiment.

For example, FIG. 3 illustrates control signals generated by the gate drive circuits DrvA, DrvB, DrvA1, DrvB1, and an intermediate voltage Vab produced by the power switches Q1, Q2, Q3, Q4 of FIG. 2. As shown, the control signals have a fixed duty cycle of about 50% (with dead time).

In the particular example of FIG. 3, the control signals generated by the gate drive circuits DrvA1, DrvB1 have a varying phase and a varying frequency. For example, the control signal generated by the gate drive circuit DrvA1 is phase shifted relative to the control signal generated by the gate drive circuit DrvA, and the control signal generated by the gate drive circuit DrvB1 is phase shifted relative to the control signal generated by the gate drive circuit DrvB. This varying phase of the control signals generated by the gate drive circuits DrvA1, DrvB1 can cause the intermediate voltage Vab to change. For example, the on time of the intermediate voltage Vab is established when both the gate drive circuits DrvA, DrvA1 are high or when both the gate drive circuits DrvB, DrvB1 are high. Therefore, varying the phase of the control signals generated by the gate drive circuits DrvA1, DrvB1 can alter this intermediate voltage Vab (e.g., change a duty cycle of the voltage), and in turn alter regulation of the output voltage Vout of FIG. 2.

Alternatively, the control circuit(s) of FIG. 2 can control the power switches Q1, Q2, Q3, Q4 with control signals having a varying frequency and a varying duty cycle (for some of the power switches), as explained above. For example, FIG. 4 illustrates control signals generated by the gate drive circuits DrvA, DrvB, DrvA1, DrvB1, SyncA, SyncB of FIG. 2, in which the control signals from the gate drive circuits DrvA1, DrvB1 have a varying duty cycle. FIGS. 5A-F illustrate current flowing through the power supply 200 of FIG. 2 when operated with the control signals of FIG. 4.

Figure 5A:
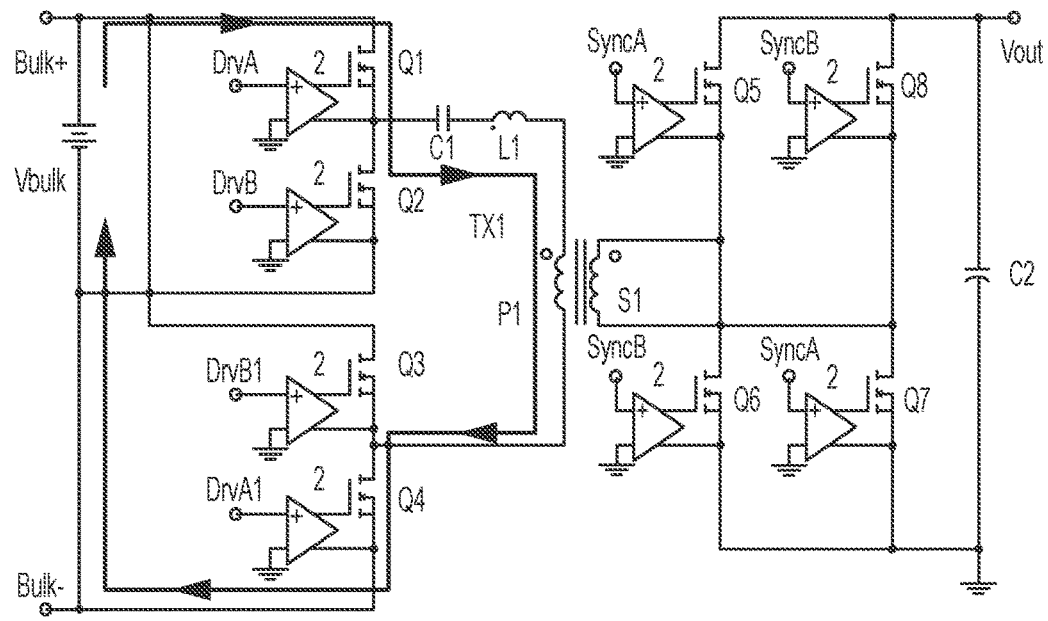

For example, FIG. 5A corresponds to the time interval (a) of FIG. 4. During this time, the power switches Q1, Q4 of FIG. 2 are on (as indicated by the control signals generated from the gate drive circuits DrvA, DrvA1 of FIG. 4). As such, power is delivered to the transformer TX1, and in turn to the power supply's output. The power switches Q1, Q4 can be turned on at the same time or at different times. For example, the power switch Q4 can be turned on before the power switch Q1, if desired.

Figure 5B:
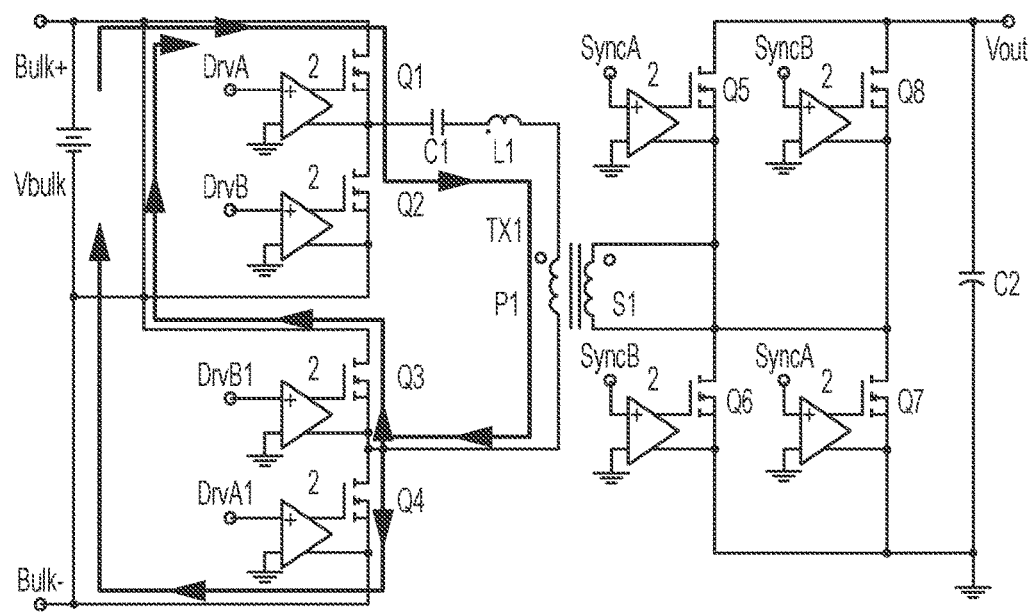

FIG. 5B corresponds to the time interval (b) of FIG. 4. As shown in FIG. 4, the power switch Q4 of FIG. 2 (having a variable duty cycle) turns off while the power switch Q1 remains on. During this time, the current in the primary winding P1 charges an output capacitance of the power switch Q4 and discharges an output capacitance of the power switch Q3. This allows the power switch Q3 to begin its zero voltage transition, as explained herein.

Figure 5C:
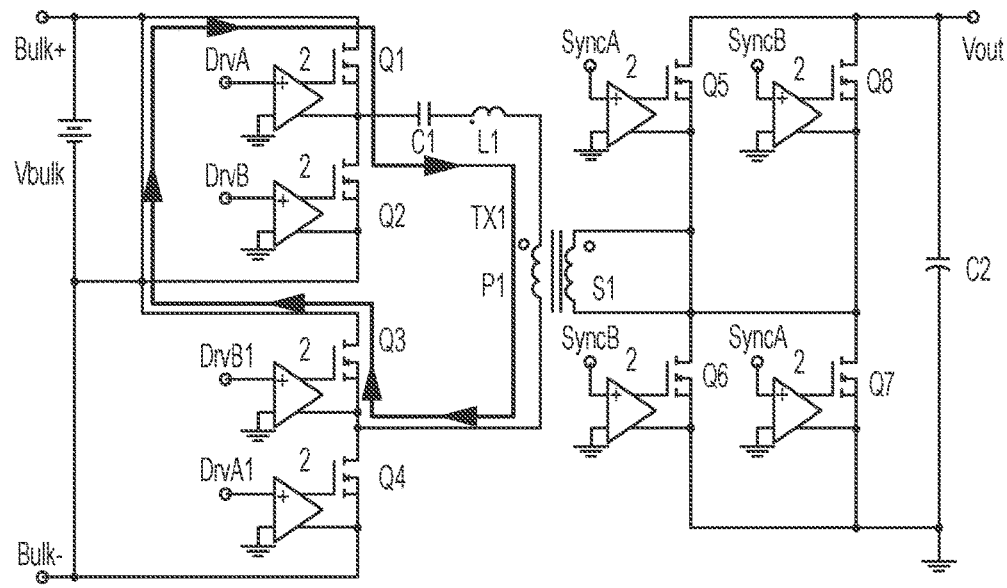

FIG. 5C corresponds to the time interval (c) of FIG. 4. During this time, an output capacitance of the power switch Q3 becomes negative, which causes the body diode of the power switch Q3 to turn on. For example, when the power switch Q4 turns off (FIG. 5B), a drain voltage of the power switch Q4 will increase until this voltage is clamped (via the body diode of the power switch Q3) to the input voltage Vbulk. Since the power switch Q1 is still on (with a fixed duty cycle), a differential voltage between the power switch Q1 and the power switch Q4 is approximately zero. This substantially prevents the secondary side switching devices from conducting, and therefore prevents magnetizing current in the transformer TX1 from entering the secondary side. The current in the primary winding P1 (including the magnetizing current) continues to circulate through the body diode of the power switch Q3 and the power switch Q1, as shown in FIG. 5c.

Figure 5D:
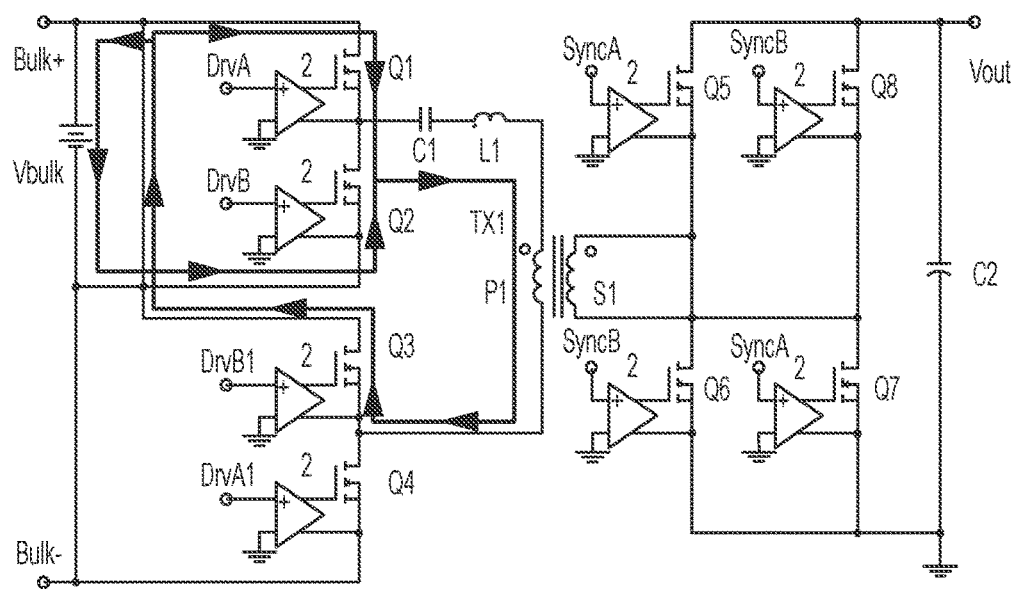

FIG. 5D corresponds to the time interval (d) of FIG. 4. As shown in FIG. 4, the power switch Q1 of FIG. 2 turns off. During this time, the current in the primary winding P1 starts to discharge an output capacitance of the power switch Q2 while charging an output capacitance of the power switch Q1. This causes the drain voltage of the power switch Q2 to decrease until the voltage is clamped through the body diode of the power switch Q2. This allows the power switch Q2 to begin its zero voltage transition, as explained herein.

Figure 5E:
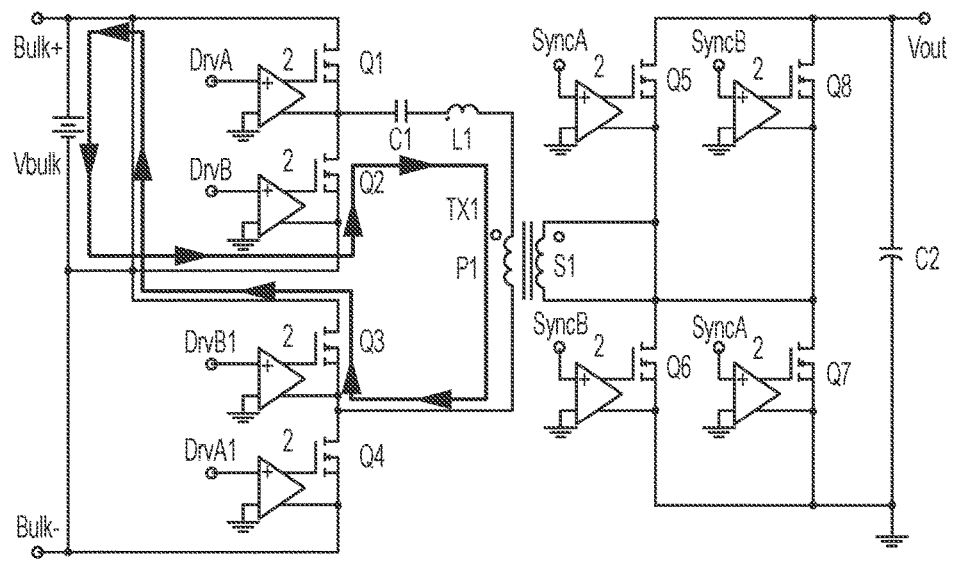

FIG. 5E corresponds to the time interval (e) of FIG. 4. This period represents the body diode of the power switch Q2 conducting after a drain voltage of the power switch Q2 becomes negative.

Figure 5F:
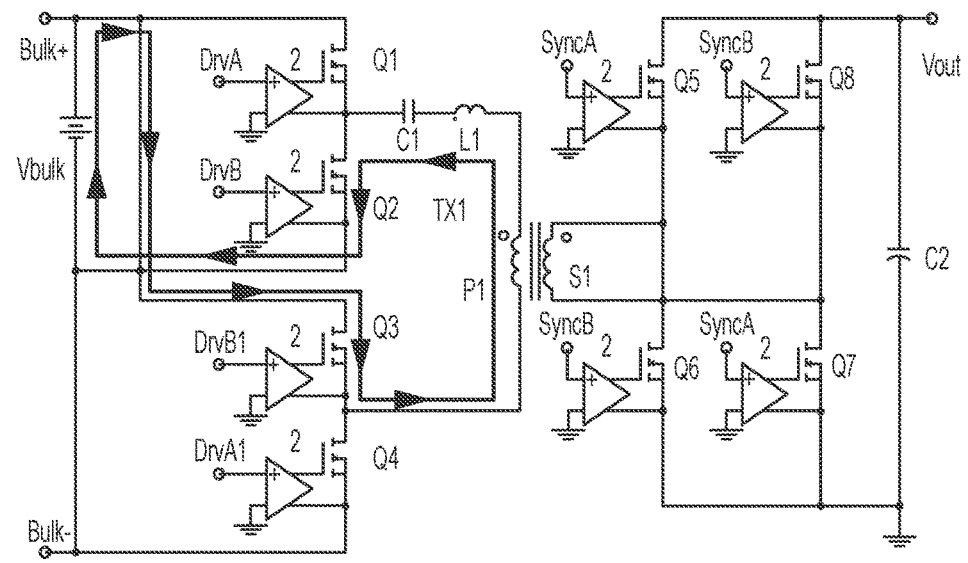

FIG. 5F corresponds to the time interval (f) of FIG. 4. During this time, the power switches Q2, Q3 of FIG. 2 turn on thereby completing the zero voltage transition of the switches Q2, Q3. Power is delivered to the transformer TX1, and in turn to the power supply's output, as explained above relative to FIG. 5A. Also, the power switches Q2, Q3 can be turned on at the same time or at different times (e.g., the power switch Q3 can be turned on before the power switch Q2, if desired). After which, the time intervals can be substantially similar to the time interval (b)-(f) (explained above), but relative to the other half of the full bridge arrangement.

Referring back to FIG. 2, the varying duty cycle or the varying phase of the control signals from the gate drive circuits DrvA1, DrvB1 can be controlled by various different control methods. For instance, the varying duty cycle or the varying phase can be controlled using output voltage set point adjustment, input voltage adjustment, switching period adjustment, load current, etc.

For example, and as shown in Table 1 below, testing of the power supply 200 of FIG. 2 has shown that the duty cycle of two control signals can be varied while maintaining the output load current and minimizing variation of the switching frequency. Additionally, and as shown in Table 1, the current flowing through the primary transformer winding P1 increases as the duty cycle decreases. This current increase, however, is relatively low compared to the reduction in the output voltage Vo.

TABLE 1

| Duty Cycle (%) | Iout (A) | Vout (Vo) | Pri. Current (A rms) |
|---|---|---|---|
| 50 | 30 | 55.698 | 5.102498 |
| 45 | 30 | 54.694 | 5.319716 |
| 40 | 30 | 52.476 | 5.550452 |
| 35 | 30 | 48.878 | 5.765379 |
| 30 | 30 | 43.352 | 5.944103 |
| 25 | 30 | 35.931 | 6.017685 |

Further, the output voltage Vo decreases in a non-linear relationship with respect to the duty cycle (which includes a dead time of about 350 ns). This non-linear relationship of the output voltage Vo can be used to determine the operating duty cycle needed to regulate the output at the output voltage set point. For example, the control circuit(s) of FIG. 2 (and/or another control circuit disclosed herein) can include an adjustable output voltage set point to provide a regulation value for the output voltage Vo. The duty cycle of the selected control signals can then be varied based on this adjustable output voltage set point. For instance, the initial operating point for the duty cycle of two control signals can be set to 25% (see Table 1) to regulate the output voltage at 35.931V (e.g., close to the desired output voltage set point of 35.9). At a later time, the output voltage set point can be adjusted to 48.8V. The duty cycle of the two control signals are then adjusted to about 35% (as shown in Table 1) to regulate the output voltage at 48.878V (e.g., close to the adjusted output voltage set point).

Equation (1) below is an example of a non-linear equation used to determine the duty cycle and the output voltage Vo, as explained above.

$$V\text{out}(\text{Calc.}) = (A \times (50\% - \text{Duty}))^2 + B \times (50\% - \text{Duty}) + C \quad (1)$$

In other embodiments, a linear equation can also be used instead of a non-linear equation to reduce complexity. Doing so, however, may cause the switching frequency to vary outside a desired range. Alternatively, a fixed number of step adjustments can be used instead of a non-linear equation.

FIGS. 6 and 7 illustrate various waveforms relating to control signals having a 50% duty cycle (from Table 1 above). For example, and as shown in FIG. 6, each gate drive circuit DrvA, DrvB, DrvA1, DrvB1 provides a control signal having a duty cycle of about 50% (including a dead time of about 350 ns). Additionally, the output voltage Vo is 55.698V and the output current is 30 A, as shown in FIG. 6 and table 1 above.

The waveforms of FIG. 7 include the voltage (Vds) across the power switches Q1, Q4, the gate drive voltage (Vgs) of the power switches Q1, Q2, Q3, Q4, and the current (e.g., an rms value of about 5.1 A) flowing through the primary transformer winding P1. As shown in FIG. 7, based on the voltage (Vds) of the power switch Q1 and the gate drive voltage (Vgs) of the power switches Q1, Q2, the power switch Q1 achieves ZVS. Likewise, based on the voltage (Vds) of the power switch Q4 and the gate drive voltage (Vgs) of the power switches Q3, Q4, the power switch Q4 achieves ZVS.

FIGS. 8 and 9 illustrate various waveforms relating to control signals having a 25% duty cycle (from Table 1 above). For example, and as shown in FIG. 8, the gate drive circuits DrvA, DrvB provide a control signal having a duty cycle of about 50% (including a dead time of about 350 ns), and the gate drive circuit DrvA1, DrvB1 provide a control signal having a duty cycle of about 25%. As shown in FIG. 8 and Table 1 above, the output voltage Vo drops to 35.931V, and the output current remains at 30 A.

The waveforms of FIG. 9 are substantially similar to the waveforms of FIG. 7, but are altered based on the 25% duty cycle. For example, the power switches Q1, Q4 achieve ZVS, as explained above. However, due to the altered duty cycle, the current flowing through the primary transformer winding P1 increases to an rms value of about 6 A, as shown in FIG. 9 and Table 1 above.

Additionally and/or alternatively, the varying duty cycle can be controlled using input voltage adjustment. For example, and similar to the adjustable output voltage set point, the duty cycle can be varied based on a predicted increase of the input voltage Vbulk with respect to a nominal input voltage.

In some examples, the power circuit 202 of FIG. 2 may be designed for a nominal input voltage of 400V. In some cases, however, the input voltage Vbulk may be higher (e.g., 440V, etc.) or lower than the nominal input voltage. In such cases, a non-linear equation (and/or a linear equation, step adjustments, etc.) can be used to calculate the duty cycle adjustment for a more stable frequency range based on the difference between the nominal input voltage and the actual input voltage Vbulk. As such, the duty cycle can be varied based on the input voltage Vbulk.

Additionally and/or alternatively, the varying duty cycle can be controlled based on a switching period of the power switches Q1, Q2. Q3, Q4 of FIG. 2. For example, depending on a particular switching period, a duty cycle can be reduced from a maximum value (e.g., about 50%). This can be represented with a continuous adjustment (e.g., linearly or nonlinearly), step adjustments, etc.

In some examples, the varying duty cycle can be controlled using each of the output voltage set point adjustment, the input voltage adjustment, and the switching period adjustment, as explained above. In such cases, equation (2) may be employed to determine the varied duty cycle.

$$\text{Duty (\%)} = \text{Fixed\_Duty} - D_{VOUTADJ} - D_{VINADJ} - D_{PERIODADJ} \quad (2)$$

Fixed_Duty represents the fixed duty cycle (e.g., a maximum duty cycle of about 50%) of the other control signals, Dvoutadj represents the duty cycle adjustment amount based on the output voltage set point adjustment, Dvinadj represents the duty cycle adjustment amount based on the input voltage adjustment, and Dperiodadj represents the duty cycle adjustment amount based on the switching period adjustment.

In other embodiments, the varying duty cycle can be controlled based on the output current of the power supply 200 if desired. Adjusting the duty cycle based on the output current may allow for a more consistent transition with respect to the load. This adjustment can be represented with a continuous adjustment (e.g., linearly or nonlinearly), step adjustments, etc.

In some examples, the duty cycle of the control signals from the gate drive circuits DrvA1, DrvB1 of FIG. 2 can vary between the fixed duty cycle of the other control signals (from the gate drive circuits DrvA, DrvB) and a defined duty cycle (e.g., a minimum duty cycle), as explained above. In such examples, the power switches Q1, Q2, Q3, Q4 can achieve ZVS between the fixed duty cycle and the defined duty cycle.

In other embodiments, the defined duty cycle is not limited to a defined duty cycle (e.g., a minimum duty cycle) during normal operating conditions. For example, decreasing the duty cycle causes an effective turn on time across the transformer TX1 to reduce which advantageously causes the peak magnetizing current of the transformer TX1 to reduce. However, the reduction peak magnetizing current can cause the drain capacitance of effected power switches to charge slower which in turn can (at times) affect ZVS of the power switches.

Referring back to FIGS. 2 and 4, the switching devices Q5, Q6, Q7, Q8 of the synchronous rectification circuit 208 can be controlled substantially similar to or different than the power switches Q3, Q4. For example, the varying duty cycle of the control signals from the gate drive circuits SyncA, SyncB can be controlled by the same or different control methods, as explained above relative to the control signals from the gate drive circuits DrvA1, DrvB1.

In the particular example of FIG. 4, the control signals from the gate drive circuits SyncA, SyncB generally follow the control signals from the gate drive circuits DrvA1, DrvB1, respectively. In some embodiments, the control signals from the gate drive circuits SyncA, SyncB can have additional on time depending on, for example, a load current, as further explained below. In some cases, this additional on time can reduce body diode conduction of the switching devices Q5, Q6, Q7, Q8. The additional on time can be represented with a linear or non-linear type of on time compensation. In some preferred embodiments, the gate drive circuits SyncA, SyncB can be adaptive gate drive circuits for adjusting the on time of the switching devices Q5, Q6, Q7, Q8.

In some embodiments, and as recognized by the subject inventors, the voltage (Vds) across the switching device Q5, Q6, Q7, Q8 may ring. For example, this voltage may ring between when the power switches Q1, Q2 (controlled by the gate drive circuits DrvA, DrvB) turn off and when the switching device Q5, Q6, Q7, Q8 (controlled by the gate drive circuits SyncA, SyncB) turn on. This ringing may be caused by, for example, the resonance between the resonant inductor L1 and the output capacitance of the switching devices Q5, Q6, Q7, Q8. In some examples, the ringing on the secondary side of the transformer TX1 can cause the current reflected to the primary side of the transformer TX1 to ring. This in turn can affect ZVS of the power switches Q1, Q2, Q3, Q4.

To reduce (and at times eliminate) this ringing, the power switches Q1, Q2, Q3, Q4 of the full bridge circuit and the switching devices Q5, Q6, Q7, Q8 of the synchronous rectification circuit 208 of FIG. 2 can be controlled differently. For example, FIG. 10 illustrates waveforms of control signals provided by the gate drive circuits SyncA, SyncB, DrvA, DrvB, DrvA1, DrvB1, in which the control signals from the gate drive circuits SyncA, SyncB, DrvA, DrvB, DrvA1, DrvB1 are altered compared to the control signals of FIG. 4. For reference, the period of time between T0 and T1 of FIG. 10 signifies the on time of the gate drive circuit DrvA1 control signal, and is referred to as Ton-dc. Likewise, the period of time between T0 and T3 signifies the on time of the gate drive circuit DrvA control signal, and is referred to as Ton-main.

As shown in FIG. 10, the control signals from the gate drive circuits SyncA, SyncB transition to their high state before the control signals from the gate drive circuits DrvA, DrvB, respectively, transition to their high state. This can assist in ZVS in the power switches Q1, Q2, Q3, Q4 during, for example, high frequency operation. For example, and as shown in FIG. 10, the gate drive circuit SyncB control signal transitions to its high state (at T4) before the gate drive circuit DrvB control signal transitions to its high state (at T5). This period of time between when the gate drive circuit SyncB control signal turns on and when the gate drive circuit DrvB control signal turns on is referred to as Tzvs.

In other words, the control circuit(s) of FIG. 2 can turn on the switching devices Q6, Q8 (which are controlled by the gate drive circuit SyncB) of the synchronous rectification circuit 208 before turning on the power switch Q2 of the power circuit 202 (which is controlled by the control signals having a fixed duty cycle or a fixed phase). Likewise, the control circuit(s) of FIG. 2 can turn on the switching devices Q5, Q7 of the synchronous rectification circuit 208 before turning on the power switch Q1 of the power circuit 202.

In some cases, controlling the switching devices Q5, Q6, Q7, Q8 in this way can cause those switching devices to turn on when ringing on their drain voltage (Vds) is at a maximum. This switching (at maximum ringing) can occur when the duty cycle of each power switch Q1, Q2, Q3, Q4 is kept constant. For example, turning on the switching devices Q5, Q6, Q7, Q8 when ringing is at a maximum can cause those devices to experience hard switching. To minimize (and at times eliminate) this hard switching, the switching devices Q5, Q6, Q7, Q8 can be controlled to switch at a ringing valley (e.g., at or near when ringing is at a minimum).

In some embodiments, valley switching can be achieved by determining a defined amount of time between when the switching devices Q5, Q6, Q7, Q8 are turned on and off. In such examples, the switching devices Q5, Q6, Q7, Q8 are turned off when current flowing through the devices goes to zero.

For instance, the control circuit(s) of FIG. 2 can turn on some of the switching devices Q5, Q6, Q7, Q8 of the rectification circuit 208 a defined period of time after other switching devices of the rectification circuit 208 are turned off. For example, and as shown in FIGS. 2 and 10, the switching devices Q6, Q8 (controlled by the gate drive circuit SyncB) are turned on a defined period of time after the switching devices Q5, Q7 (controlled by the gate drive circuit SyncA) are turned off. This period of time is between T2 and T4 of FIG. 10, and is referred to as Tres-adj. Likewise, the switching devices Q5, Q7 (controlled by the gate drive circuit SyncA) can be turned on a defined period of time after the switching devices Q6, Q8 (controlled by the gate drive circuit SyncB) are turned off. The two periods of time may be the same or different.

One or both of the defined periods of time can be adjustable. In other embodiments, one or both defined periods of time is fixed. For example, the period of time (e.g., the time period Tres-adj) can be fixed to ensure the switching devices Q5, Q6, Q7, Q8 are switched at a valley of the ringing. For instance, because the resonant frequency between the output capacitance of the appropriate rectification switching devices and the resonant inductor L1 can be characterized, a fixed time delay (Tres-adj) between when the switching devices Q5, Q7 (controlled by the gate drive circuit SyncA) turns off and when the switching devices Q6, Q8 (controlled by the gate drive circuit SyncB) turns on can be used depending on, for example, the number of resonant cycles. For example, equation (3) below is a linear equation for the time delay (Tres-adj).

$$T_{RES-ADJ} = (N_{CYCLE} + 0.5) \times T_{RES-PERIOD} \tag{3}$$

In equation (3), Tres-period represents the resonant period, and Ncycle represents the number of resonant cycles before turning on the switching devices Q5, Q6, Q7, Q8. The number of resonant cycles can vary from zero to a maximum number where Tres-adj is less than half of the switching period. When the fixed time delay Tres-adj increases, the period of time Ton-dc (explained herein) decreases causing the duty cycle to reduce. Therefore, the number of resonant cycles Ncycle can be adjusted to change the fixed time delay Tres-adj, which in turn causes an adjustment of the duty cycle. The number of resonant cycles can be adjusted based on, for example, the output voltage Vout, the input voltage Vbulk, the output current, and/or switching frequency.

In some examples, the on time of the rectification switching devices Q5, Q6, Q7, Q8 can be extended. This additional on time can, for example, reduce (and sometimes eliminate) conduction loss when the current on the secondary side of the transformer TX1 of FIG. 2 ramps down. The additional on time can be applied to one or both control signals controlling the switching devices Q5, Q6, Q7, Q8. Additionally, the additional on time can be adjustable as desired. Therefore, the duty cycle of the control signals provided to the switching devices Q5, Q6, Q7, Q8 can be varied.

For example, and as shown in FIG. 10, the gate drive circuit SyncA control signal includes additional on-time, which is shown between T1 and T2. This additional on-time is referred to as Tiout-adj. The additional on-time (Tiout-adj) can depend on, for example, the output current Iout, the output voltage Vout, the input voltage Vbulk, etc. However, by knowing the output voltage Vout and input voltage Vbulk, the additional on-time (e.g., a ramp-down time) can be predicted by using a linear or non-linear equation. A sample linear equation is shown below in equation (4):

$$T_{iout-adj} = I_{out} \times Gain1 + Offset1 \tag{4}$$

In equation (4), Gain1 represents the slope compensation for adjusting Tiout-adj with respect to the output current Iout, and Offset 1 represents the offset compensation for adjusting Tiout-adj with respect to the output current Iout. These compensation values are used to predict that the secondary current ramp down time is approximately equal to the additional on time for control signals of the gate drive circuits SyncA, SyncB.

Additionally, the on time of the gate drive circuit DrvA1 control signal (Ton-dc) can be calculated based on the additional on-time Tiout-adj, the time period Tzvs, the time delay Tres-adj, and a time interval (Tsw/2) representing one half-cycle period of the control signals of FIG. 10, as explained above. This sets the duty cycle for control signals gate of the drive circuits DrvA1, DrvB1. For example, equation (5) below can be used to calculate the time Ton-dc.

$$T_{ON-DC} = \left(\frac{T_{SW}}{2}\right) - T_{ZVS} - T_{RES-ADJ} - T_{IOUT-ADJ} \qquad (5)$$

Additionally, FIG. 10 illustrates voltage waveforms of the drain voltage (VDsr1) of the switching devices Q5, Q7 (controlled by the gate drive circuit SyncA control), and a voltage (VDSmaxFet) across the power switch Q2. FIG. 10 also illustrates the output current (SecCurrent) of the power supply 200 of FIG. 2.

Figure 11A:
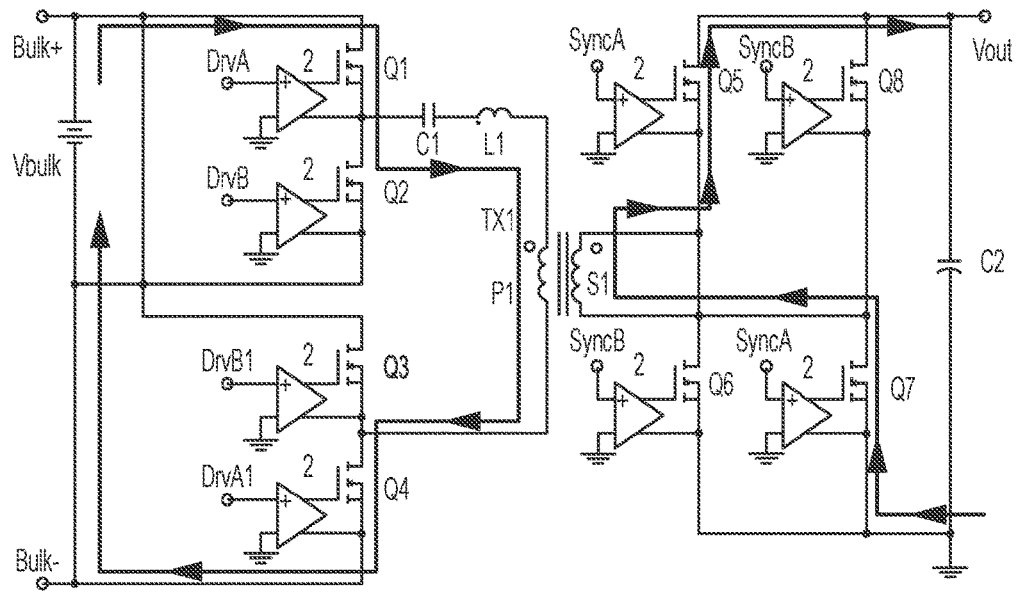
Figure 11B:
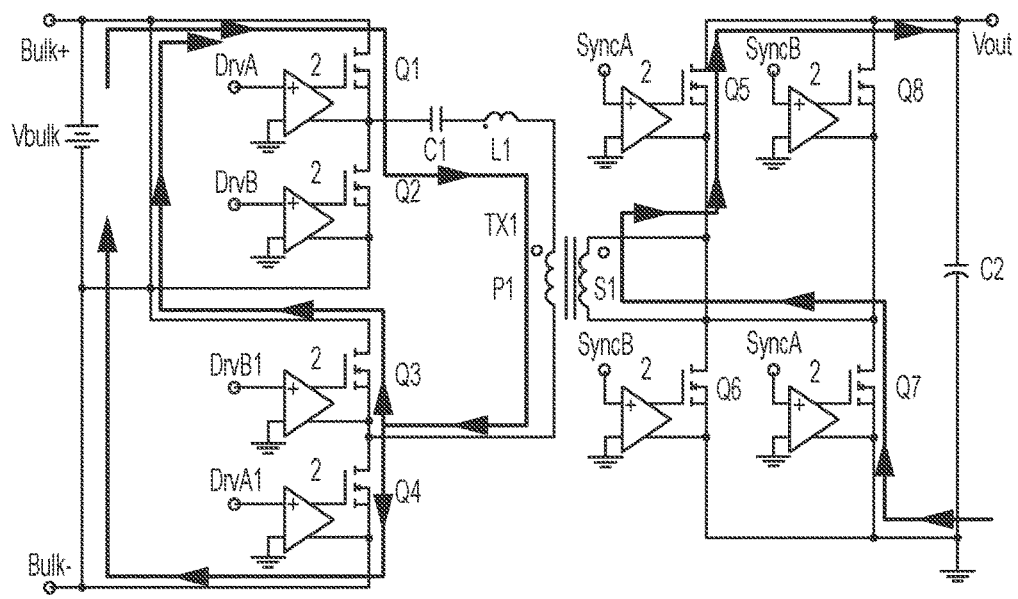
Figure 11C:
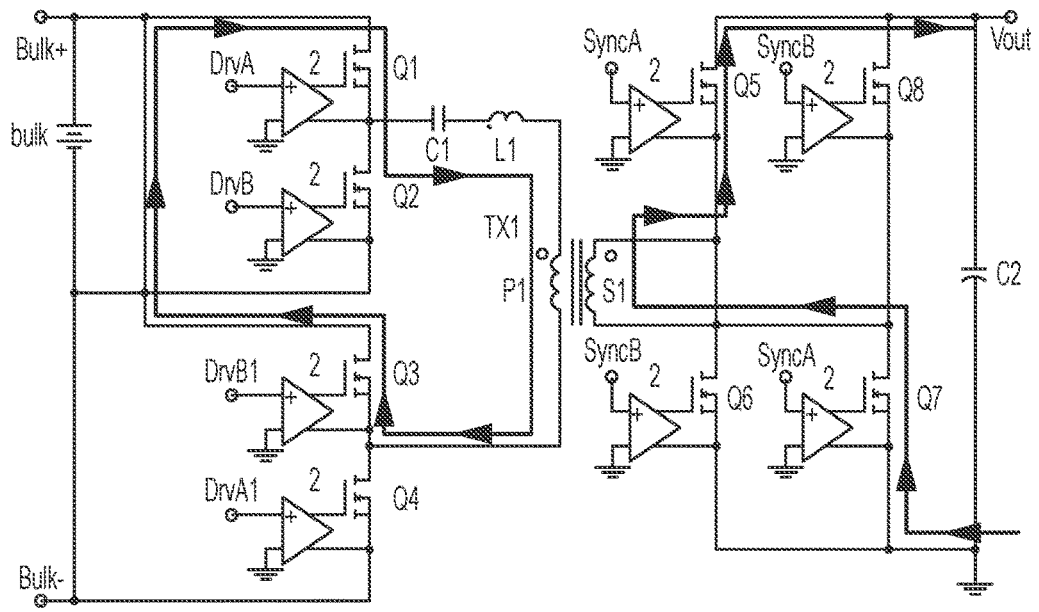

FIGS. 11A-H illustrate current flowing through the power supply 200 of FIG. 2 when operated with the control signals of FIG. 10. The current flowing through the power supply 200 of FIGS. 11A and 11B is similar to current flowing through the power supply 200 of FIGS. 5A and 5B. For example, FIG. 11A illustrates the power switches Q1, Q4 of FIG. 2 in their on state, which is indicated by the gate drive circuits DrvA, DrvA1 control signals at T0 of FIG. 10. As such, power is delivered to the transformer TX1, and in turn to the power supply's output, as explained above. The power switches Q1, Q4 can be turned on at the same time or at different times. For example, the power switch Q4 can be turned on before the power switch Q1.

Likewise, FIG. 11B illustrates the power switch Q4 of FIG. 2 in its off state. During this time, the power switches Q3, Q4 can switch at zero voltage, as explained above relative to FIG. 5B.

Like in FIG. 5C described above, FIG. 11C illustrates a period of time in which an output capacitance of the power switch Q3 becomes negative. This causes the body diode of the power switch Q3 to turn on and clamp the output current (SecCurrent), as explained above. Additionally, the primary winding P1 current (e.g., the transformer magnetizing current and the reflected secondary side current) circulates through the power switch Q1 and the body diode of the power switch Q3. Further, the current (SecCurrent) in the secondary side of the transformer TX1 of FIG. 2 starts to ramp down to zero. When this current reaches zero, switching devices Q5, Q7 turn off.

Figure 11D:
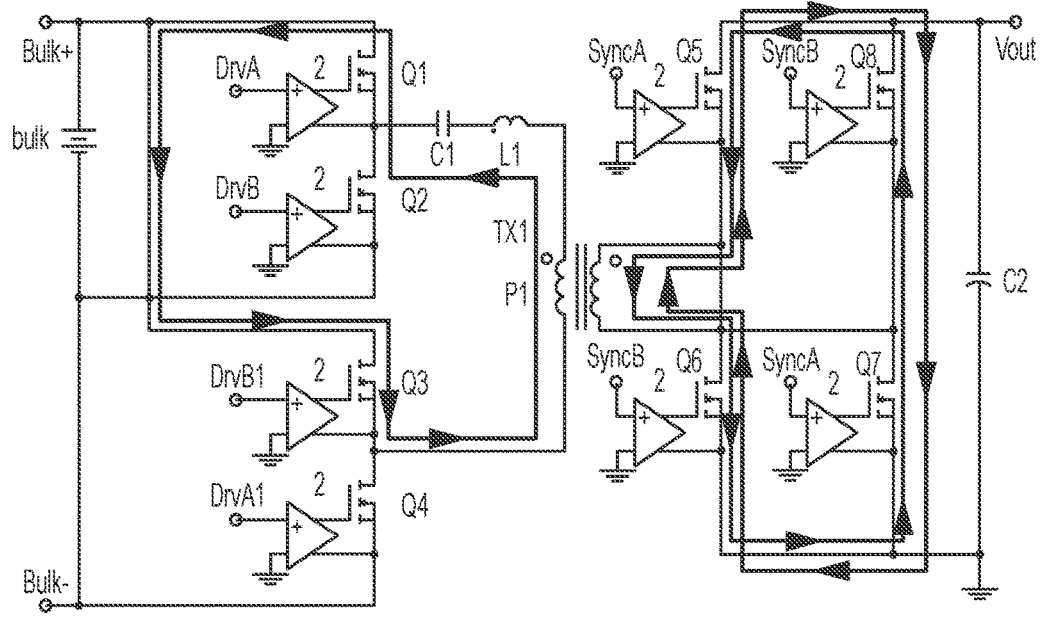

FIG. 11D illustrates a period of time when the secondary side current starts ringing (e.g., oscillating between a negative value and a positive value). In some cases, ringing of the secondary side current may cause ringing in the primary side current as well. As explained above, the secondary side ringing may be due to, for example, resonance between the output capacitance of the rectification switching device(s) and the resonant inductor L1. This causes a drain voltage (Vds) of one or more secondary side switching devices to ring, as explained above. Additionally, during this period of time the primary winding P1 current continues to circulate through the power switch Q1 and the power switch's Q3 body diode.

Figure 11E:
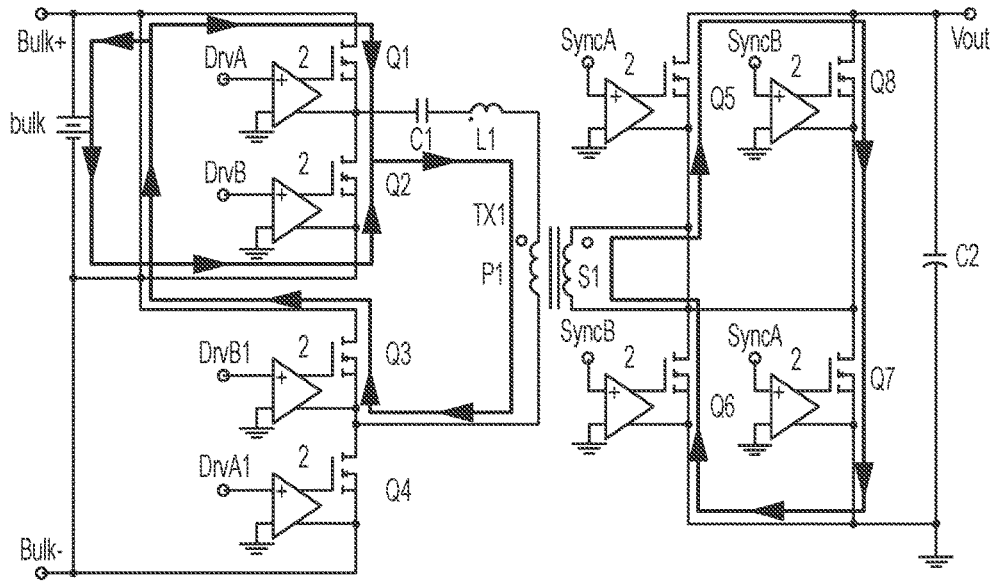

FIG. 11E illustrates the power switch Q1 of FIG. 2 in its off state. During this time, the primary side current begins to discharge from the output capacitance of the power switch Q2 and charge the output capacitance of power switch Q1. This allows the power switches Q1, Q2 to switch at zero voltage, as explained above.

Figure 11F:
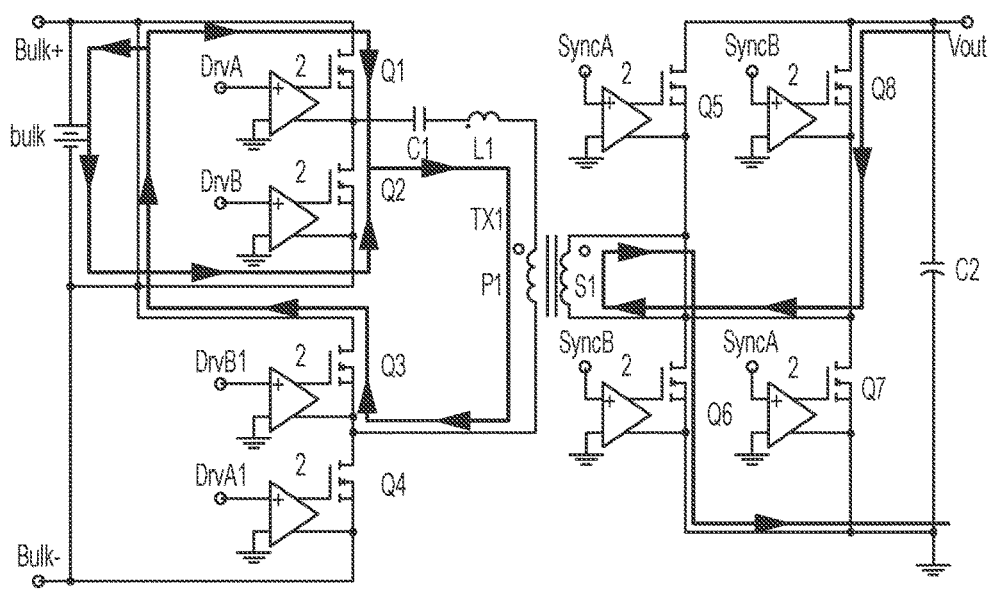

FIG. 11F illustrates the rectification switching devices Q6, Q8 of FIG. 2 in their on state. Advantageously, the switching devices Q6, Q8 may be turned on when their drain voltage is close to a minimum (e.g., valley switching as explained above). As explained above, this turn on time of the switching devices Q6, Q8 is before the turn on time of the power switch Q2.

After the switching devices Q6, Q8 turn on, current begins to flow in a reverse direction from the output, as shown in FIG. 11F. This current flow can aid in the zero voltage transition of the power switches Q1, Q2 (as explained above). Additionally, adjusting the time period Tzvs (as explained above), can adjust the amount of reverse current. The reverse current (and therefore the time period Tzvs) is preferably minimized to achieve ZVS. This is because the current taken from the output is offset by increasing the primary and secondary peak current, which may increase conduction losses.

Figure 11G:
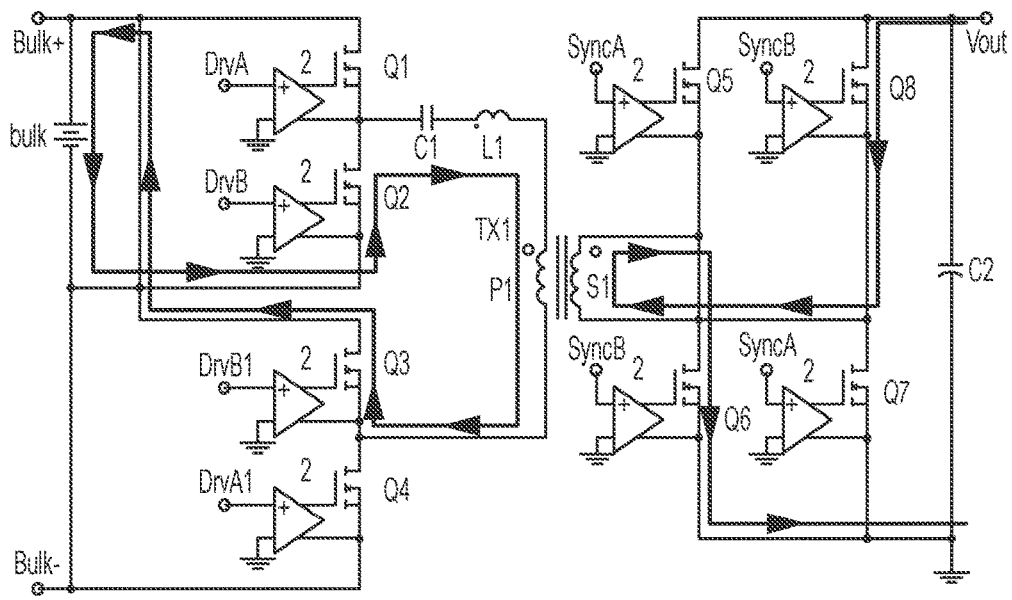

FIG. 11G illustrates the power switch Q2 when its drain voltage becomes negative. At this time, the body diode of the power switch Q2 begins to conduct.

Figure 11H:
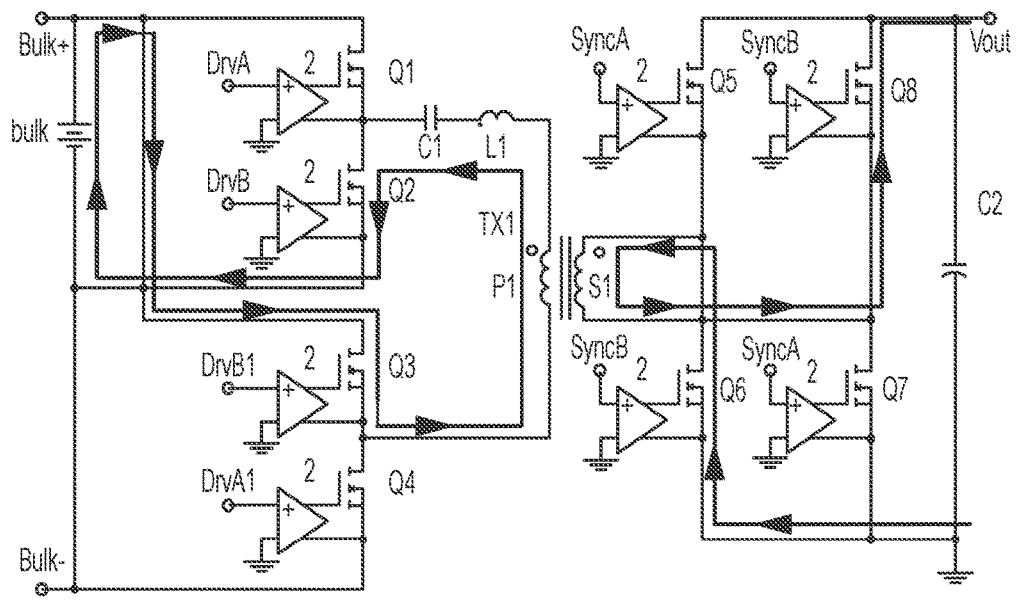

FIG. 11H illustrates the power switches Q2, Q3 of FIG. 2 in their on state. As such, power is delivered to the transformer TX1, and in turn to the power supply's output, as explained above relative to FIG. 11A. Likewise, the power switches Q2, Q3 can be turned on at the same time or at different times. For example, the power switch Q3 can be turned on before the power switch Q2.

Although FIG. 2 illustrates a particular configuration between the gate drive circuits, other suitable configurations can be employed without departing from the scope of the disclosure. For example, FIGS. 12 and 13 each illustrate a switched mode DC-DC power supply 1200, 1300 having different gate drive circuit configurations as compared to the power supply 200 of FIG. 2.

As shown in FIG. 12, the gate drive circuits DrvB, DrvB1 are switched. As such, the gate drive circuits DrvB1 generates a control signal for the power switch Q2, and the gate drive circuits DrvB generates a control signal for the power switch Q3. This allows the low side power switches Q2, Q4 to have a varying duty cycle or phase, and the high side power switches Q1, Q3 to have a fixed duty cycle or phase, as explained above.

Similarly, and as shown in FIG. 13, the gate drive circuits DrvA, DrvA1 are switched. As such, the gate drive circuits DrvA1 generates a control signal for the power switch Q1, and the gate drive circuits DrvA generates a control signal for the power switch Q4. This allows the high side power switches Q1, Q3 to have a varying duty cycle or phase, and the low side power switches Q2, Q4 to have a fixed duty cycle or phase, as explained above.

In some examples, the control signal from the gate drive circuit DrvA1, DrvB1 of FIGS. 12 and 13 can have a duty cycle of about 25%, and the control signal from the gate drive circuit DrvA, DRVB of FIGS. 12 and 13 can have a duty cycle of about 75%. In such examples, the gate drive circuits DrvA, DrvB1 form one complementary pair, and the gate drive circuits DrvB, DrvA1 form another complementary pair. The gate drive circuit DrvA1, DrvB1 control signals can vary between a defined duty cycle (e.g., a minimum duty cycle such as zero) and about a 50% duty cycle. Alternatively, the gate drive circuit DrvA, DrvB control signals can vary between a 50% duty cycle and a defined duty cycle (e.g., a maximum duty cycle such as 100%). The gate drive circuit configurations of the power supplies 1200, 1300 of FIGS. 12 and 13 can reduce primary losses compared to other power supplies due to, for example, reduced body diode conduction when the primary side current circulates through the power switches Q1, Q2, Q3, Q4.

The control signals disclosed herein having a varying duty cycle are shown and described as having a trailing edge adjustment. For example, the control signals from the gate drive circuits DrvA1, DrvB1, SyncA, SyncB experience a trailing edge adjustment to vary their duty cycle. Alternatively, a leading edge adjustment can be implemented, if desired.

Additionally, it should apparent that one or more of the various control features disclosed herein can be implemented in one or more control methods. For example, a method can be implemented to regulate an output voltage of a DC-DC power supply having four power switches arranged in a full bridge configuration. The method can include, for example, providing control signals to the power switches, varying a frequency of the control signals, and varying a duty cycle or a phase of only two of the control signals.

Further, the control circuits disclosed herein may include an analog control circuit, a digital control circuit (e.g., a digital signal control circuit (DSC), a digital signal processor (DSP), etc.), or a hybrid control circuit (e.g., a digital control circuit and an analog circuit). Additionally, the control circuits may include one or more processors for implementing converter control features as explained herein. One or more components (e.g., processor(s), etc.) of the control circuits may be disposed on one or more integrated circuits.

For example, FIG. 14 illustrates a switched mode DC-DC power supply 1400 similar to the power supply 200 of FIG. 2. For example, the power supply 1400 includes an LLC converter 1402 having the transformer TX1 coupled between an LLC converter primary side 1404 and an LLC converter secondary side 1406. Similar to the power supply 200 of FIG. 2, four power switches are arranged in a full bridge configuration on the LLC converter primary side 1404 of FIG. 14, and a rectification circuit having at least two switching devices is positioned on the LLC converter secondary side 1406 of FIG. 14.

Additionally, the power supply 1400 includes a digital control circuit 1408 having a digital controller 1410 and two driver ICs 1412, 1414. The digital control circuit 1408 can vary the duty cycle, the phase and/or the frequency of control signals provided to the power switches on the LLC converter primary side 1404 and the switching devices on the LLC converter secondary side 1406, as explained above.

As shown in FIGS. 14 and 15, the digital controller 1410 senses an output voltage and current, and provides signals to driver ICs 1412, 1414. Specifically, and as shown in FIGS. 14 and 15, signals Apwm, Bpwm, A1pwm, B1pwm are provided to the driver IC 1412, and signals SRpwmA, SRpwmB are provided to the driver IC 1414. The driver IC 1412 includes the gate drive circuits DrvA, DrvB, DrvA1, DrvB1 (as explained herein) for generating control signals for the power switches on the LLC converter primary side 1404 based on the signals from the digital controller 1410. Similarly, the driver IC 1414 includes the gate drive circuits SyncA, SyncB (as explained herein) for generating control signals for the switching devices on the LLC converter secondary side 1406 based on the signals from the digital controller 1410.

The features disclosed herein can be employed in any suitable full-bridge configuration including, for example, the full bridge LLC configurations as disclosed herein. The full-bridge configuration can be coupled to any suitable rectification circuit such as those disclosed herein. For example, the rectification circuit can include a full-bridge configuration (as explained above), a center-tapped configuration, etc.

The power supplies disclosed herein can be used in multiphase power systems for various different applications including, for example, high power applications. In some examples, the power supplies can include one or more other power circuits (e.g., a buck converter, a boost converter such as a front-end AC-DC boost converter, etc.) coupled to the power circuits disclosed herein.

By employing one or more of the features disclosed herein, a range of output voltage regulation in the power supplies disclosed herein can be increased compared to known power supplies, and a switching frequency in the power supplies can be reduced (compared to known power supplies) during normal operation. Also, the feature(s) can be used to substantially prevent burst mode operation during light-load conditions and substantially prevent high frequency operation during, for example, high input voltage levels (e.g., 305 Vac, 440 Vdc, etc.).

Additionally, employing the feature(s) can provide greater soft-start control in the power supplies compared to known power supplies, maintain full ZVS in power switches (e.g., even at light load conditions), provide valley switching for the secondary side switching devices, etc. Further, and in contrast to known power supplies, the feature(s) can reduce the dependency on magnetizing current in achieving ZVS.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switched mode DC-DC power supply comprising:
a power circuit having an input for receiving an input voltage, an output for providing an output voltage, and four power switches coupled between the input and the output, the four power switches arranged in a full bridge configuration, and
a control circuit coupled to the power circuit for providing a plurality of control signals to the four power switches of the power circuit during a time period when the four power switches are operational, the plurality of control signals including four control signals corresponding to the four power switches and having a variable frequency, the control circuit configured to vary the frequency of the four control signals, and to vary a parameter of only two of the four control signals to achieve zero voltage switching (ZVS) of the four power switches and regulate the output voltage,
wherein said parameter is a duty cycle or a phase of said two control signals.

2. The switched mode DC-DC power supply of claim 1 wherein the control circuit includes at least two gate drive circuits configured to generate the plurality of control signals.

3. The switched mode DC-DC power supply of claim 1 wherein the power circuit includes an LLC converter having at least one capacitor and at least one inductor.

4. The switched mode DC-DC power supply of claim 1 wherein the parameter is the phase of said two control signals.

5. The switched mode DC-DC power supply of claim 4 wherein the control circuit is configured to fix a duty cycle of the plurality of control signals.

6. The switched mode DC-DC power supply of claim 5 wherein the fixed duty cycle is about 50%.

7. The switched mode DC-DC power supply of claim 4 wherein the phase of said two control signals is varied substantially the same.

8. The switched mode DC-DC power supply of claim 1 wherein the parameter is the duty cycle of said two control signals.

9. The switched mode DC-DC power supply of claim 8 wherein the duty cycle of said two control signals is varied substantially the same.

10. The switched mode DC-DC power supply of claim 8 wherein the control circuit is configured to fix a duty cycle of another two of the plurality of control signals, and wherein the duty cycle of said only two of the plurality of control signals varies between the fixed duty cycle of the other two of the plurality of control signals and a defined duty cycle lower than the fixed duty cycle.

11. The switched mode DC-DC power supply of claim 10 wherein the fixed duty cycle is a maximum duty cycle of the other two of the plurality of control signals.

12. The switched mode DC-DC power supply of claim 1 wherein the power circuit includes a rectification circuit having at least two switching devices.

13. The switched mode DC-DC power supply of claim 12 wherein the control circuit is configured to provide a plurality of control signals to the at least two switching devices of the rectification circuit, and wherein the control circuit is configured to vary a duty cycle of the plurality of control signals provided to the at least two switching devices of the rectification circuit.

14. The switched mode DC-DC power supply of claim 12 wherein the control circuit is configured to fix a duty cycle or a phase of another two of the plurality of control signals provided to the power switches of the power circuit, and wherein the control circuit is configured to turn on one of the two switching devices of the rectification circuit before turning on one of the power switches of the power circuit controlled with a control signal having a fixed duty cycle or a fixed phase.

15. The switched mode DC-DC power supply of claim 12 wherein the control circuit is configured to turn on one of the switching devices of the rectification circuit a defined period of time after another one of the switching devices of the rectification circuit is turned off.

16. The switched mode DC-DC power supply of claim 15 wherein the defined period of time is fixed.

17. The switched mode DC-DC power supply of claim 1 wherein the control circuit includes an adjustable output voltage set point to provide a regulation value for the output voltage, and wherein the parameter of the plurality of control signals is varied based on the adjustable output voltage set point.

18. The switched mode DC-DC power supply of claim 1 wherein the parameter of the plurality of control signals is varied based on the input voltage.

19. The switched mode DC-DC power supply of claim 1 wherein the parameter of the plurality of control signals is varied based on a switching period of the power switches.

20. The switched mode DC-DC power supply of claim 1 wherein two of the four power switches have substantially complementary on-times and wherein the two control signals having the varying parameter are provided to the two power switches having substantially complementary on-times.

* * * * *